US008098272B2

(12) United States Patent
Katz

(10) Patent No.: US 8,098,272 B2
(45) Date of Patent: *Jan. 17, 2012

(54) COMMERCIAL PRODUCT ROUTING SYSTEM WITH VIDEO VENDING CAPABILITY

(75) Inventor: Ronald A. Katz, Los Angeles, CA (US)

(73) Assignee: Telebuyer, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/724,330

(22) Filed: Nov. 26, 2003

(65) Prior Publication Data

US 2004/0109058 A1    Jun. 10, 2004

Related U.S. Application Data

(63) Continuation of application No. 09/371,212, filed on Aug. 10, 1999, now Pat. No. 7,848,496, which is a continuation of application No. 08/189,405, filed on Jan. 27, 1994, now Pat. No. 6,323,894, which is a continuation-in-part of application No. 08/154,313, filed on Nov. 17, 1993, now Pat. No. 5,495,284, which is a continuation-in-part of application No. 08/067,783, filed on May 25, 1993, now abandoned, which is a continuation-in-part of application No. 08/031,235, filed on Mar. 12, 1993, now Pat. No. 5,412,708.

(51) Int. Cl.
*H04N 7/14* (2006.01)

(52) U.S. Cl. ............... 348/14.01; 379/93.12; 379/93.25

(58) Field of Classification Search ............... 348/14.01, 348/14.07, 14.08, 14.14; 379/93.12, 93.25, 379/93.24, 93.21, 93.17; 705/25–28
See application file for complete search history.

(56) References Cited

U.S. PATENT DOCUMENTS

| 1,162,336 | A | 11/1915 | Campbell |
| 2,575,606 | A | 11/1951 | Wales et al. |
| 2,957,567 | A | 10/1960 | Doud |
| 3,144,518 | A | 8/1964 | Lummis |
| 3,246,082 | A | 4/1966 | Levy |
| 3,253,689 | A | 5/1966 | Thompson |
| 3,445,633 | A | 5/1969 | Ratner |
| 3,504,130 | A | 3/1970 | Gorgas et al. |

(Continued)

FOREIGN PATENT DOCUMENTS

| CA | 1162336 | 2/1984 |
| EP | 0 010 399 A1 | 4/1980 |
| EP | 0 188 286 | 7/1986 |
| EP | 0265083 A1 | 9/1987 |

(Continued)

OTHER PUBLICATIONS

Ackerman, Lorrie F., et al., "The Video Phone: New Life for an Old Idea?" Apr. 1992, pp. 1-47 (paper).

(Continued)

*Primary Examiner* — Stella Woo
(74) *Attorney, Agent, or Firm* — Berry & Associates P.C.

(57) ABSTRACT

A traffic control system selectively interfaces members of plural groups, as buyer groups and vendor groups, for video communication through a dial-up telephone system, for analyzing and compiling data, scheduling appointments, implementing conferences, consummating sales and the like. The traffic-control system comprises a telephonic interface apparatus for interfacing remote telephonic terminals of the dial-up telephone system identified with the members of plural groups, a video recording unit for recording and playing video transcriptions, a storage memory for storing data on the members, including telephonic terminal numbers and area-of-interest codes and a control computer to selectively interconnect the video recording unit with the remote telephone terminals through the telephonic interface apparatus to record and receive video communication.

55 Claims, 7 Drawing Sheets

U.S. PATENT DOCUMENTS

| | | | |
|---|---|---|---|
| 3,515,807 A | 6/1970 | Clark | |
| 3,544,727 A | 12/1970 | Sloan et al. | |
| 3,609,250 A | 9/1971 | Morris | |
| 3,622,995 A | 11/1971 | Dilks et al. | |
| 3,691,308 A | 9/1972 | Angner et al. | |
| 3,705,384 A | 12/1972 | Wahlberg | |
| 3,725,587 A | 4/1973 | Klein | 179/2 |
| 3,775,563 A | 11/1973 | Klein | 179/2 |
| 3,792,202 A | 2/1974 | Adams, Jr. et al. | |
| 3,792,446 A | 2/1974 | McFiggins et al. | |
| 3,794,774 A | 2/1974 | Kemmerly et al. | |
| 3,881,060 A | 4/1975 | Connell et al. | |
| 3,903,373 A | 9/1975 | Gueldenpfennig et al. | |
| 3,909,553 A | 9/1975 | Marshall | |
| 3,912,874 A | 10/1975 | Botterell et al. | |
| 3,991,282 A | 11/1976 | Feil | |
| 4,004,084 A | 1/1977 | Brown et al. | 358/133 |
| 4,027,098 A | 5/1977 | Reisch et al. | |
| 4,037,250 A | 7/1977 | McGahan et al. | |
| 4,054,908 A | 10/1977 | Poirier et al. | 358/85 |
| 4,070,698 A | 1/1978 | Curtis et al. | |
| 4,090,038 A | 5/1978 | Biggs | |
| 4,137,429 A | 1/1979 | Stockdale | |
| 4,139,731 A | 2/1979 | Hashemi et al. | |
| 4,141,006 A | 2/1979 | Braxton | |
| 4,150,254 A | 4/1979 | Schussler et al. | |
| 4,150,259 A | 4/1979 | Fenton et al. | |
| 4,173,024 A | 10/1979 | Miller | |
| 4,186,438 A | 1/1980 | Benson et al. | |
| 4,190,819 A | 2/1980 | Burgyan | |
| 4,193,114 A | 3/1980 | Benini | |
| 4,194,242 A | 3/1980 | Robbins | |
| 4,195,864 A | 4/1980 | Morton et al. | |
| 4,232,198 A | 11/1980 | Warman | |
| 4,247,759 A | 1/1981 | Yuris et al. | |
| 4,259,549 A | 3/1981 | Stehman | |
| 4,262,333 A | 4/1981 | Horigome et al. | |
| 4,270,042 A | 5/1981 | Case | |
| 4,277,649 A | 7/1981 | Sheinbein | |
| 4,289,930 A | 9/1981 | Connolly et al. | |
| 4,295,008 A | 10/1981 | Johnson et al. | |
| 4,332,980 A | 6/1982 | Reynolds et al. | 179/2 |
| 4,346,442 A | 8/1982 | Musmanno | |
| 4,359,631 A | 11/1982 | Lockwood et al. | |
| 4,360,345 A | 11/1982 | Hon | |
| 4,360,827 A | 11/1982 | Braun | |
| RE31,144 E | 2/1983 | Feil | |
| 4,376,875 A | 3/1983 | Beirne | |
| 4,393,277 A | 7/1983 | Besen et al. | |
| 4,400,724 A | 8/1983 | Fields | 358/85 |
| 4,412,287 A | 10/1983 | Braddock, III | |
| 4,424,418 A | 1/1984 | Moore et al. | |
| 4,424,572 A | 1/1984 | Lorig et al. | |
| 4,449,186 A | 5/1984 | Kelly et al. | |
| 4,450,477 A | 5/1984 | Lovett | |
| 4,451,701 A | 5/1984 | Bendig | |
| 4,455,455 A | 6/1984 | Little | |
| 4,456,789 A | 6/1984 | Groves et al. | |
| 4,460,807 A | 7/1984 | Kerr et al. | 179/18 |
| 4,475,189 A | 10/1984 | Herr et al. | 370/62 |
| 4,475,190 A | 10/1984 | Marouf et al. | |
| 4,479,185 A | 10/1984 | Cook | |
| 4,479,195 A | 10/1984 | Herr et al. | 364/900 |
| 4,490,810 A | 12/1984 | Hon | |
| 4,493,948 A | 1/1985 | Sues et al. | |
| 4,496,943 A | 1/1985 | Greenblatt | |
| 4,528,643 A | 7/1985 | Freeny, Jr. | |
| 4,529,839 A | 7/1985 | Colton et al. | 179/2 |
| 4,529,840 A | 7/1985 | Colton et al. | 179/2 |
| 4,531,024 A | 7/1985 | Colton et al. | 179/2 |
| 4,540,850 A | 9/1985 | Herr et al. | |
| 4,541,087 A | 9/1985 | Comstock | |
| 4,544,804 A | 10/1985 | Herr et al. | |
| 4,550,224 A | 10/1985 | Winchell | |
| 4,553,222 A | 11/1985 | Kurland et al. | |
| 4,559,415 A | 12/1985 | Bernard et al. | |
| 4,566,030 A | 1/1986 | Nickerson et al. | |
| 4,567,359 A | 1/1986 | Lockwood | |
| 4,574,374 A | 3/1986 | Scordo | 370/62 |
| 4,577,065 A | 3/1986 | Frey et al. | |
| 4,577,067 A | 3/1986 | Levy et al. | |
| RE32,115 E | 4/1986 | Lockwood et al. | |
| 4,580,012 A | 4/1986 | Matthews et al. | |
| 4,591,906 A | 5/1986 | Morales-Garza et al. | |
| 4,611,095 A | 9/1986 | LeBlanc et al. | |
| 4,625,081 A | 11/1986 | Lotito et al. | |
| 4,626,836 A | 12/1986 | Curtis et al. | |
| 4,635,251 A | 1/1987 | Stanley et al. | |
| 4,641,127 A | 2/1987 | Hogan et al. | |
| 4,645,872 A | 2/1987 | Pressman et al. | 379/54 |
| 4,645,873 A | 2/1987 | Chomet | |
| 4,648,108 A | 3/1987 | Ellis et al. | |
| 4,649,563 A | 3/1987 | Riskin | |
| 4,652,998 A | 3/1987 | Koza et al. | |
| 4,653,045 A | 3/1987 | Stanley et al. | |
| 4,654,482 A | 3/1987 | DeAngelis | |
| 4,656,654 A | 4/1987 | Dumas | |
| 4,674,044 A | 6/1987 | Kalmus et al. | |
| 4,691,347 A | 9/1987 | Stanley et al. | |
| 4,694,490 A | 9/1987 | Harvey et al. | |
| 4,704,725 A | 11/1987 | Harvey et al. | |
| 4,706,121 A | 11/1987 | Young | |
| 4,710,917 A | 12/1987 | Tompkins et al. | 370/62 |
| 4,712,191 A | 12/1987 | Penna | |
| 4,715,059 A | 12/1987 | Cooper-Hart et al. | 379/53 |
| 4,720,849 A | 1/1988 | Tayama | |
| 4,727,243 A | 2/1988 | Savar | |
| 4,734,858 A | 3/1988 | Schlafly | |
| 4,736,407 A | 4/1988 | Dumas | |
| 4,739,478 A | 4/1988 | Roberts et al. | |
| 4,739,510 A | 4/1988 | Jeffers et al. | |
| 4,742,457 A | 5/1988 | Leon et al. | |
| 4,744,103 A | 5/1988 | Dahlquist et al. | |
| 4,745,468 A | 5/1988 | Von Kohorn | |
| 4,751,640 A | 6/1988 | Lucas et al. | |
| 4,755,871 A | 7/1988 | Morales-Garza et al. | |
| 4,757,267 A | 7/1988 | Riskin | |
| 4,758,872 A | 7/1988 | Hada | |
| 4,761,684 A | 8/1988 | Clark et al. | |
| 4,763,191 A | 8/1988 | Gordon et al. | |
| 4,766,592 A | 8/1988 | Baral et al. | |
| 4,775,935 A | 10/1988 | Yourick | |
| 4,788,682 A | 11/1988 | Vij et al. | |
| 4,789,863 A | 12/1988 | Bush | |
| 4,789,928 A | 12/1988 | Fujisaki | |
| 4,791,666 A | 12/1988 | Cobb et al. | |
| 4,792,968 A | 12/1988 | Katz | |
| 4,794,530 A | 12/1988 | Yukiura et al. | |
| 4,796,293 A | 1/1989 | Blinken et al. | |
| 4,797,911 A | 1/1989 | Szlam et al. | |
| 4,797,913 A | 1/1989 | Kaplan et al. | |
| 4,799,156 A | 1/1989 | Shavit et al. | |
| 4,803,348 A | 2/1989 | Lohrey et al. | |
| 4,805,134 A | 2/1989 | Calo et al. | |
| 4,807,023 A | 2/1989 | Bestler et al. | |
| 4,812,628 A | 3/1989 | Boston | |
| 4,823,265 A | 4/1989 | Nelson | |
| 4,825,045 A | 4/1989 | Humble | |
| 4,825,457 A | 4/1989 | Lebowitz | |
| 4,827,500 A | 5/1989 | Binkerd et al. | |
| 4,833,308 A | 5/1989 | Humble | |
| 4,833,710 A | 5/1989 | Hirashima | |
| 4,843,377 A | 6/1989 | Fuller et al. | |
| 4,845,636 A | 7/1989 | Walker | |
| 4,845,658 A | 7/1989 | Gifford | |
| 4,845,739 A | 7/1989 | Katz | |
| 4,847,677 A | 7/1989 | Music et al. | 358/13 |
| 4,847,829 A | 7/1989 | Tompkins et al. | 370/62 |
| 4,852,154 A | 7/1989 | Lewis et al. | |
| 4,870,579 A | 9/1989 | Hey | |
| 4,873,662 A | 10/1989 | Sargent | |
| 4,876,597 A | 10/1989 | Roy et al. | |
| 4,876,648 A | 10/1989 | Lloyd | |
| 4,878,240 A | 10/1989 | Lin et al. | |
| 4,878,242 A | 10/1989 | Springer et al. | |
| 4,885,685 A | 12/1989 | Wolfberg et al. | |
| 4,887,208 A | 12/1989 | Schneider et al. | |

| | | | | | | |
|---|---|---|---|---|---|---|
| 4,893,248 A | 1/1990 | Pitts et al. | | 5,222,018 A | 6/1993 | Sharpe et al. |
| 4,893,325 A | 1/1990 | Pankonen et al. | | 5,224,157 A | 6/1993 | Yamada et al. |
| 4,893,326 A | 1/1990 | Duran et al. | | 5,229,850 A | 7/1993 | Toyoshima |
| 4,897,867 A | 1/1990 | Foster et al. | | 5,231,571 A | 7/1993 | D'Agostino |
| 4,903,201 A | 2/1990 | Wagner | | 5,233,654 A | 8/1993 | Harvey et al. |
| 4,907,160 A | 3/1990 | Duncan et al. | | 5,235,509 A | 8/1993 | Mueller et al. |
| 4,908,761 A | 3/1990 | Tai | | 5,235,680 A | 8/1993 | Bijinagte |
| 4,910,672 A | 3/1990 | Off et al. | | 5,237,499 A | 8/1993 | Garback |
| 4,910,676 A | 3/1990 | Alldredge | | 5,237,500 A | 8/1993 | Perg et al. |
| 4,916,435 A | 4/1990 | Fuller | | 5,237,620 A | 8/1993 | Deaton et al. |
| 4,922,520 A | 5/1990 | Bernard et al. | | 5,239,462 A | 8/1993 | Jones et al. |
| 4,926,325 A | 5/1990 | Benton et al. | | 5,241,464 A | 8/1993 | Greulich et al. |
| 4,928,177 A | 5/1990 | Martinez | | 5,241,587 A | 8/1993 | Horton et al. |
| 4,937,856 A | 6/1990 | Natarajan | | 5,241,671 A | 8/1993 | Reed et al. |
| 4,939,773 A | 7/1990 | Katz | | 5,247,347 A | 9/1993 | Litteral et al. ............... 358/85 |
| 4,943,995 A | 7/1990 | Daudelin et al. | | 5,262,942 A | 11/1993 | Earle |
| 4,945,410 A | 7/1990 | Walling ............ 358/141 | | 5,264,929 A | 11/1993 | Yamaguchi |
| 4,947,028 A | 8/1990 | Gorog | | 5,270,920 A | 12/1993 | Pearse et al. |
| 4,951,196 A | 8/1990 | Jackson | | 5,283,637 A | 2/1994 | Goolcharan ................. 348/17 |
| 4,952,928 A | 8/1990 | Carroll et al. | | 5,283,638 A | 2/1994 | Engberg et al. ............. 348/14 |
| 4,954,886 A | 9/1990 | Elberbaum | | 5,283,639 A | 2/1994 | Esch et al. .................. 348/6 |
| 4,955,052 A | 9/1990 | Hussain | | 5,283,731 A | 2/1994 | Lalonde et al. |
| 4,962,473 A | 10/1990 | Crain | | 5,283,819 A | 2/1994 | Glick et al. ................. 379/90 |
| 4,965,819 A | 10/1990 | Kannes ............ 379/53 | | 5,285,383 A | 2/1994 | Lindsey et al. |
| 4,965,825 A | 10/1990 | Harvey et al. | | 5,289,275 A | 2/1994 | Ishii et al. |
| 4,967,366 A | 10/1990 | Kaehler | | 5,293,615 A | 3/1994 | Amada |
| 4,972,318 A * | 11/1990 | Brown et al. ............ 705/26 | | 5,295,064 A | 3/1994 | Malec et al. |
| 4,980,826 A | 12/1990 | Wagner | | 5,297,197 A | 3/1994 | Katz |
| 4,987,590 A | 1/1991 | Katz | | 5,305,196 A | 4/1994 | Deaton et al. |
| 4,989,233 A | 1/1991 | Schakowsky et al. | | 5,305,200 A | 4/1994 | Hartheimer et al. |
| 4,992,866 A | 2/1991 | Morgan | | 5,309,355 A | 5/1994 | Lockwood |
| 4,992,940 A | 2/1991 | Dworkin | | 5,319,542 A * | 6/1994 | King et al. .................. 705/27 |
| 4,996,642 A | 2/1991 | Hey | | 5,321,514 A | 6/1994 | Martinez .................... 725/62 |
| 5,010,485 A | 4/1991 | Bigari | | 5,323,315 A | 6/1994 | Highbloom |
| 5,014,267 A | 5/1991 | Tompkins et al. ............ 370/62 | | 5,323,445 A | 6/1994 | Nakatsuka |
| 5,020,129 A | 5/1991 | Martin et al. | | 5,325,194 A | 6/1994 | Natori et al. ................. 348/15 |
| 5,021,953 A | 6/1991 | Webber et al. | | 5,327,508 A | 7/1994 | Deaton et al. |
| 5,032,989 A | 7/1991 | Tornetta | | 5,329,578 A | 7/1994 | Brennan et al. |
| 5,042,062 A | 8/1991 | Lee et al. | | 5,335,277 A | 8/1994 | Harvey et al. |
| 5,043,889 A | 8/1991 | Lucey | | 5,341,374 A | 8/1994 | Lewen et al. ................ 370/85.4 |
| 5,053,956 A | 10/1991 | Donald et al. | | 5,347,632 A | 9/1994 | Filepp et al. |
| 5,053,957 A | 10/1991 | Suzuki | | 5,351,133 A | 9/1994 | Blonstein |
| 5,056,019 A | 10/1991 | Schultz et al. | | 5,351,186 A | 9/1994 | Bullock et al. |
| 5,056,136 A | 10/1991 | Smith ............... 380/10 | | 5,353,218 A | 10/1994 | De Lapa et al. |
| 5,060,068 A | 10/1991 | Lindstrom | | 5,353,219 A | 10/1994 | Mueller et al. |
| 5,061,916 A | 10/1991 | French et al. | | 5,361,199 A | 11/1994 | Shoquist et al. |
| 5,063,507 A | 11/1991 | Lindsey et al. | | 5,365,577 A | 11/1994 | Davis et al. |
| 5,065,393 A | 11/1991 | Sibbitt et al. | | 5,367,273 A | 11/1994 | Georger et al. ............. 333/1 |
| 5,072,103 A | 12/1991 | Nara | | 5,369,571 A | 11/1994 | Metts |
| 5,077,665 A | 12/1991 | Silverman et al. | | 5,371,534 A | 12/1994 | Dagdeviren et al. |
| 5,077,788 A | 12/1991 | Cook et al. | | 5,375,055 A | 12/1994 | Togher et al. |
| 5,091,933 A | 2/1992 | Katz | | 5,381,412 A | 1/1995 | Otani ......................... 370/84 |
| 5,093,718 A | 3/1992 | Hoarty et al. | | 5,382,972 A | 1/1995 | Kannes ....................... 348/15 |
| 5,101,353 A | 3/1992 | Lupien et al. | | 5,384,841 A | 1/1995 | Adams et al. |
| 5,109,399 A | 4/1992 | Thompson | | 5,388,165 A | 2/1995 | Deaton et al. |
| 5,109,414 A | 4/1992 | Harvey et al. | | 5,392,223 A | 2/1995 | Caci ........................... 364/514 |
| 5,117,354 A | 5/1992 | Long et al. | | 5,402,336 A | 3/1995 | Spiegelhoff et al. |
| 5,127,049 A | 6/1992 | Sabo | | 5,406,324 A | 4/1995 | Roth ........................... 348/22 |
| 5,136,501 A | 8/1992 | Silverman et al. | | 5,410,343 A | 4/1995 | Coddington et al. |
| 5,136,581 A | 8/1992 | Muehrcke | | 5,412,416 A | 5/1995 | Nemirofsky ................ 348/10 |
| 5,146,404 A | 9/1992 | Calloway et al. | | 5,412,708 A | 5/1995 | Katz |
| 5,151,782 A | 9/1992 | Ferraro | | 5,426,281 A | 6/1995 | Abecassis |
| 5,164,979 A | 11/1992 | Choi | | 5,440,336 A | 8/1995 | Buhro et al. |
| 5,164,982 A | 11/1992 | Davis | | 5,440,624 A | 8/1995 | Schoof et al. |
| 5,168,445 A | 12/1992 | Kawashima et al. | | 5,442,688 A | 8/1995 | Katz |
| 5,168,446 A | 12/1992 | Wiseman | | 5,442,771 A | 8/1995 | Filepp et al. |
| 5,170,427 A | 12/1992 | Guichard et al. | | 5,450,123 A * | 9/1995 | Smith ......................... 348/14.12 |
| 5,173,851 A | 12/1992 | Off et al. | | 5,451,998 A | 9/1995 | Hamrick |
| 5,191,410 A | 3/1993 | McCalley et al. | | 5,452,289 A | 9/1995 | Sharma et al. .............. 370/32 |
| 5,191,613 A | 3/1993 | Graziano et al. | | 5,455,903 A | 10/1995 | Jolissaint et al. |
| 5,193,056 A | 3/1993 | Boes | | 5,465,291 A | 11/1995 | Barrus et al. |
| 5,195,092 A | 3/1993 | Wilson et al. ............. 370/94.2 | | 5,475,585 A | 12/1995 | Bush |
| 5,199,062 A | 3/1993 | Von Meister et al. | | 5,481,294 A | 1/1996 | Thomas et al. |
| 5,201,010 A | 4/1993 | Deaton et al. | | 5,481,605 A | 1/1996 | Sakurai et al. |
| 5,202,759 A | 4/1993 | Laycock | | 5,485,370 A | 1/1996 | Moss et al. |
| 5,204,670 A | 4/1993 | Stinton | | 5,490,060 A | 2/1996 | Malec et al. |
| 5,206,803 A | 4/1993 | Vitagliano et al. | | 5,491,797 A | 2/1996 | Thompson et al. .......... 395/200 |
| 5,209,665 A | 5/1993 | Billings et al. | | 5,495,284 A | 2/1996 | Katz |
| 5,220,501 A | 6/1993 | Lawlor et al. | | 5,500,793 A | 3/1996 | Deming, Jr. et al. |

| | | | |
|---|---|---|---|
| 5,502,636 A | 3/1996 | Clarke | |
| 5,515,424 A | 5/1996 | Kenney | |
| 5,528,281 A | 6/1996 | Grady et al. | |
| 5,528,513 A | 6/1996 | Vaitzblit et al. | |
| 5,534,912 A | 7/1996 | Kostreski | |
| 5,537,590 A | 7/1996 | Amado | |
| 5,539,448 A | 7/1996 | Verhille et al. | |
| 5,557,518 A | 9/1996 | Rosen | |
| 5,568,181 A | 10/1996 | Greenwood et al. | |
| 5,576,951 A | 11/1996 | Lockwood | |
| 5,581,479 A | 12/1996 | McLaughlin et al. | |
| 5,583,763 A | 12/1996 | Atcheson et al. | |
| 5,583,928 A | 12/1996 | Tester et al. | |
| 5,592,375 A | 1/1997 | Salmon et al. | |
| 5,602,905 A | 2/1997 | Mettke | |
| 5,602,908 A | 2/1997 | Fan | |
| 5,604,487 A | 2/1997 | Frymier | |
| 5,606,359 A | 2/1997 | Youden et al. | |
| 5,606,496 A | 2/1997 | D'Agostino | |
| 5,621,812 A | 4/1997 | Deaton et al. | |
| 5,630,068 A | 5/1997 | Vela et al. | |
| 5,644,723 A | 7/1997 | Deaton et al. | |
| 5,682,195 A | 10/1997 | Hendricks et al. | |
| 5,684,870 A | 11/1997 | Maloney et al. | |
| 5,689,553 A | 11/1997 | Ahuja et al. | |
| 5,710,887 A | 1/1998 | Chelliah et al. | |
| 5,712,906 A * | 1/1998 | Grady et al. | 379/93.25 |
| 5,721,832 A | 2/1998 | Westrope et al. | |
| 5,724,646 A | 3/1998 | Ganek et al. | |
| 5,727,164 A | 3/1998 | Kaye et al. | |
| 5,729,594 A | 3/1998 | Klingman | 379/93.12 |
| 5,740,035 A | 4/1998 | Cohen et al. | |
| 5,742,931 A | 4/1998 | Spiegelhoff et al. | |
| 5,758,328 A | 5/1998 | Giovannoli | |
| 5,793,413 A | 8/1998 | Hylton et al. | |
| 5,794,207 A | 8/1998 | Walker et al. | |
| 5,796,967 A | 8/1998 | Filepp et al. | |
| 5,815,146 A | 9/1998 | Youden et al. | |
| 5,845,265 A | 12/1998 | Woolston | |
| 5,870,724 A | 2/1999 | Lawlor et al. | |
| 5,884,272 A | 3/1999 | Walker et al. | 705/1 |
| 5,905,973 A | 5/1999 | Yonezawa et al. | |
| 5,937,086 A | 8/1999 | Taguchi | 382/165 |
| 5,973,722 A | 10/1999 | Wakai et al. | |
| 6,072,402 A | 6/2000 | Kniffin et al. | 340/825.31 |
| 6,157,711 A | 12/2000 | Katz | |
| 6,323,894 B1 * | 11/2001 | Katz | 348/14.08 |
| 6,418,211 B1 | 7/2002 | Irvin | |
| 6,608,636 B1 | 8/2003 | Roseman | 345/753 |
| 6,802,062 B1 | 10/2004 | Oyamada et al. | 718/1 |
| 7,072,849 B1 | 7/2006 | Filepp et al. | |
| 7,835,508 B1 * | 11/2010 | Katz | 379/93.12 |
| 7,835,509 B2 * | 11/2010 | Katz | 379/93.12 |
| 7,839,984 B2 * | 11/2010 | Katz | 379/93.12 |
| 7,848,496 B2 * | 12/2010 | Katz | 379/93.12 |
| 2002/0120554 A1 | 8/2002 | Vega | 705/37 |

FOREIGN PATENT DOCUMENTS

| | | |
|---|---|---|
| FR | 2 658 635 A1 | 8/1991 |
| GB | 1 504 112 | 3/1978 |
| GB | 1 504 113 | 3/1978 |
| GB | 2 105 075 A | 3/1983 |
| GB | 1 437 883 | 6/1986 |
| JP | SHO 50-98626 | 1/1974 |
| JP | SHO 49-73198 | 7/1974 |
| JP | SHO 50-133892 | 10/1975 |
| JP | SHO 52-72800 | 11/1975 |
| JP | SHO 54-60000 | 5/1979 |
| JP | SHO 57-92254 | 6/1982 |
| JP | 62-190552 | 8/1987 |
| JP | 0 029 456 | 2/1991 |
| JP | 0 109 198 | 4/1991 |
| WO | WO 89/02139 | 3/1989 |
| WO | WO 92/15174 A1 | 9/1992 |

OTHER PUBLICATIONS

"American, IBM, American Express to Test Automatic Ticket Vendor," *Aviation Daily*, Oct. 30, 1969.

"An ISDN Primer: Technology and Network Implications," *Business Communications Review*, 1986.

Andrade, Juan M., et al. "Open On-Line Transaction Processing With the TUXEDO System," *UNIX System Laboratories, Digest of Papers Compcon Spring 1992*, IEEE Computer Society Press, Feb. 24-28, 1992, pp. 366-371.

Andrews, E.L., "FCC Plan to Set Up 2-Way TV," *The New York Times*, Business Day, Jan. 11, 1991, p. C1.

Angiolillo, J., et al., "Personal Visual Communications Enters the Market Place," *Visual Communications, AT&T Technology Products, Systems and Services*, vol. 7, No. 3, Fall 1992, pp. 18-28.

Applebaum, Simon, "Two-Way Television," *CableVision*, Aug. 8, 1983, p. 66.

Arnbak, J., "ISDN: Innovative Services or Innovative Technology?" *Proceedings of the IFIP TC 6/ICCC Joint Conference on ISDN in Europe*, Apr. 25-27, 1989, pp. 45-51 and pp. 405-411.

"AT&T Picasso Phone-Still Image Phone Gets New Secure Capability," *AT&T News Release*, Jun. 7, 1994.

"Picasso Phone Sends High-Quality Images Over Ordinary Lines," *AT&T News Release*, May 11, 1993.

*Auerbach on Data Collection Systems*, Auerbach Publishers, Inc., 1972, Chapters 3, 4, 5 and 13.

Bocker, P., *ISDN The Integrated Services Digital Network*, Springer-Verlag Berlin Heidelberg, 1988, pp. 1-52.

Bowen, Charles et ano., *How to get the Most Out of CompuServe*, 5$^{th}$ Ed., Bantam Books, 1993, Table of Contents pp. v-xxi; "CompuServe Mail" pp. 50-55; Chapter 12 "Shopping," pp. 283-299; and Appendix pp. 453-455.

Brand, Stewart "Founding Father," *Wired*, Mar. 9, 2001.

Brittan, David, "Being There the Promise of Multimedia Communications," *Technology Review*, May/Jun. 1992, pp. 44-50.

Broom, Michael, "AT&T Launches Online Buying for Wireless Products and Services; Largest Wireless Carrier to Offer Automated Online Store," *Business Wire*, Oct. 29, 1998.

Cerbone, R., "The Coming HDTV Wave," *Visual Communications, AT&T Technology Products, Systems and Services*, vol. 7, No. 3, Fall 1992, pp. 14-17.

Cheung, J.B., et al. "ISDN: Evolutionary Step to Integated Access and Transport Services," *AT&T Bell Laboratories Record*, Nov. 1985.

Del Rosso, Laura, "Marketel Says it Plans to Launch Air Fare 'Auction' in June," *Travel Weekly*, Apr. 29, 1991.

Del Rosso, Laura, "Ticket-Bidding Firm Closes its Doors," *Travel Weekly*, Mar. 12, 1992.

Delatore, J.P., et al., "ISDN Data Networking Applications in the Corporate Environment," *AT&T Technical Journal*, vol. 67, No. 5, Nov./Dec. 1988, pp. 107-120.

"Electronic In-Home Shopping: Our Stores Are Always Open," *Chain Store Age Executive*, Mar. 1985, pp. 111, 116.

Ellis, M.L., et al., "INDAX: An Operational Interactive Cabletext System," *IEEE Journal on Selected Areas in Communications*, vol. SAC-1, No. 2, Feb. 1983, pp. 285-293.

Englander, A.C., et al. "Creating Tomorrow's Multimedia Systems Today," *Visual Communications, AT&T Technology Products, Systems and Services*, vol. 7, No. 3, Fall 1992, pp. 24-30.

Ensor, J. Robert, et al., "The Rapport Multimedia Conferencing System—A Software Overview," *AT&T Bell Laboratories*, IEEE, 1988, pp. 52-58.

Ericson, D., et al., "New Concepts of Addressability," *Pay Per Views*, Dec. 1989, vol. 3, No. 1, pp. 8, 10, 12-14.

Francas, M., et al., "Input Devices for Public Videotex Services," *Human-Computer Interaction—INTERACT '84*, Proceedings of the IFIP Conference Sep. 4-7, 1984, pp. 171-175.

Fry, Jason, "Buying the Goods, Person to Person," *The Wall Street Journal*, Dec. 7, 1998.

Gawrys, G.W., "Ushering in the Era of ISDN," *AT&T Technology*, vol. 1, No. 1, 1986, pp. 2-9.

GE Information Services brochures: "Getting Started on GEIS' EDI Services", "UPC*Express an Extended Capability of the EDI*Express System", Business card of Marty Costello, EDI Sales Consultant for GE Information Services, "EDI Products and Services Expand Your Business Horizons With the World's Leading EDI Provider", "Electronic Data Interchange: Your Competitive Edge in Managing Today's Business Cycle", Information Services Agreement Service Description and Price Schedule EDI*Express Service, Feb. 1, 1991. U.S. EDI Software Price List, Jul. 1, 1991. EDI*PC Order Form Version 7, U.S. Order Form. "Introduction to Electronic Data Interchange a Primer," *GE Information Services U.S.A.*

Godfrey, D., et al., *The Telidon Book—Designing and Using Videotex Systems*, Reston Publishing Company, Inc., 1981, pp. 1-103.

Golden, Fran, "AAL's Riga Doubts Marketel's Appeal to Retailers," *Travel Weekly*, Nov. 13, 1999.

Gould, D., "Audio Response Units," *Pay Per Views*, Sep. 1989, pp. 19-20, 22.

Harvey, D.E., et al., "Videoconferencing Systems: Seeing is Believing," *Visual Communications, AT&T Technology Products, Systems and Services*, vol. 7, No. 3, Fall 1992, pp. 7-13.

Haszto, E.D., et al., "Alliance Teleconferencing Services Boost Business Efficiency," *AT&T Technology*, vol. 3, No. 1, pp. 22-31.

Heidkamp, Martha M., "Reaping the Benefits of Financial EDI," *Management Accounting*, May 1991, pp. 2-3, 39-43.

Herr, T.J., "ISDN Applications in Public Switched Networks," *AT&T Technology*, vol. 2, No. 3, 1987, pp. 56-65.

"ICS Launches New In-Home Interactive Video Service Package," *CableVision*, Sep. 3, 1984, pp. 71, 73.

Imai, R., "Multimedia Communication Technology," *Fujitsu Scientific & Technical Journal*, No. 2, Summer 1992.

*Introduction to ISDN*, Online Publications, 1987, pp. 1-79.

*ISDN Reference Manual (Integrated Services Digital Network)*, AT&T, Jul. 1987 (Manual).

*ISDN Strategies*, Sample Issue, 1986.

*ISDN Strategies*, vol. 1, No. 1, Jul. 1986.

*ISDN Strategies*, vol. 2, No. 3, Mar. 1987.

*ISDN Strategies*, vol. 3, No. 12, Dec. 1988.

*ISDN Strategies*, vol. 3, No. 4, No. 1, Jan. 1989 through vol. 4, No. 7, Jul. 1989.

Kamin, I., *Questions and Answers About TV*, Howard W. Sams & Co., Inc., 1973.

Kauza, J.J., "ISDN: A Customer's Service," *AT&T Technology*, vol. 4, No. 3, 1989, pp. 4-11.

Kim, B.G., "Current Advances in LANs, MANs & ISDN," Artech House, Inc., 1989, Chapter 4.

Kuhl, C., "Operators' Handbook The PPV Billing Challenge is Keeping it Simple While Obtaining Valuable Marketing Information," *CableVision*, Jan. 15, 1990, pp. 49, 52.

Kuttner, Robert, "Computers May Turn the World Into One Big Commodities Pit," *Business Week*, Sep. 11, 1989.

Lachenbruch, D., "Video News," *Radio Electronics*, Dec. 1989.

Long, J., et al., "Transaction Processing Using Videotex or Shopping on Prestel," Human-Computer Interaction—INTERACT '84, Proceedings of the IFIP Conference, Sep. 4-7, 1984, pp. 251-255.

"AT&T Receives FDA Approval to Market Picasso as Diagnostic Tool," *Lucent Technologies Press Release*, Mar. 9, 1995.

"MCA Discovision," 1979 (Manual/Brochure).

Miller, Michael, "Using CompuServe," 2$^{nd}$ Ed. Que Corporation, 1994: Contents at a Glance / Introduction; Chapters 12, 13, 14, 15, 16, 17, 18, 36, 38 and 39 (face page only).

NASDAQ Website Printouts: "NASDAQ Evolution," http://www.nasdaq-amex.com/mktofmkts/22nasevo.stm, "Order Handling Rules," http://www.nasdaq-amex.com/mktofmkts/22ordhan.stm, "Limit Order," http://www.nasdaq-amex.com/mktofmkts/23limord.stm, "How is a Trade Executed," http://www.nasdaq-amex.com/mktofmkts/22howisa.stm, "Market Order," http://www.nasdaq-amex.com/mktofmkts/23marord.stm, "Limit Order," http://www.nasdaq-amex.com/mktofmkts/23limord.stm, "Short Selling," http://www.nasdaq-amex.com/mktofmkts/23shosel.stm, "Quoting in ¹⁄₁₆ths," http://www.nasdaq-amex.com/mktofmkts/22quoino.stm.

Neville, T., et al., "The Application of National Ani to Pay-Per-View Ordering," *1988 NCTA Technical Papers*.

*Online Review*, vol. 3, No. 2, 1979, pp. 140-141 (Article).

Pelline, Jeff, "Travelers Bidding on Airline Tickets: Sf Firm Offers Chance for Cut-Rate Fares," *San Francisco Chronicle*, Section A4, Aug. 19, 1991.

Perry, Y., "Data Communications in the ISDN Era," *Proceedings of the IFIP TC6 First International Conference on Data Communications in the ISDN Era*, Mar. 4-5, 1985.

Posko, A.L., "Versatile Services Streamline Global Videoconferencing," *Visual Communications, AT&T technology products, Systems and Services*, vol. 3, No. 3, Fall 1992, pp. 2-8.

*Prodigy Made Easy*, 2$^{nd}$ Ed., Osborne McGraw Hill, 1993, Table of Contents; Foreword, Chapters 6 and 10.

"Profit From Impulse Pay-Per-View," *Telephony*, Jul. 14, 1986 (Advertisement).

Rangan, P. Venkat, "Video Conferencing, File Storage, and Management in Multimedia Computer Systems".

"Ref. FCC Tariff Nos. 2, 4, 9," Apr. 1988 (Article).

Ritter, Jeffrey B., "Scope of the Uniform Commercial Code: Computer Contracting Cases and Electronic Commercial Practice," 45 Bus. Law.2533,2535 (Aug. 1990).

Rusche, J., "Business Programming for the Video Disc," pp. 118-137 (Chapters from a book).

Schrage, Michael, "An Experiment in Economic Theory; Labs Testing Real Markets," *The Record*, Section B1, Nov. 26, 1989.

"Shopping Via a Network is No Longer Just Talk," *Data Communications*, Aug. 1981, p. 43.

Spiedel, Richard E., "Impact of Electronic Contracting on Contract Formation Under Revised UCC Article 2, Sales", C878 ALI-ABA 335 (Dec. 9, 1993).

"System Will Enable Customer to Establish Prebilled 'Credit Bank'," *Communications Daily*, Aug. 15, 1990.

Takei, Daisuke, "Videotex Information System and Credit System Connecting With MARS-301 of JNR," *Japanese Railway Engineering*, No. 95, Sep. 1985, pp. 9-11.

Teweles, Richard J., et al., *The Stock Market*, 5$^{th}$ Ed., John Wiley & Sons, Inc., 1987, Series Preface and Chapt. 9.

"Web Ventures Presents BookIt!," http://www.webventures.com/bookit/.

Wright, Peter, "Vision by Telephone," *Computer Systems*, No. 1, Jan. 6, 1986.

"Wurlitzer Card Control: Unveiled at the Recent National Automatic Merchandising Association Convention Was This Magnetic Card Vending System From Deutsche Wurlitzer GmbH," *Vending Times*, Nov. 1989 (Article).

Yager, T., "Better Than Being There," *Byte*, No. 3, Mar. 18, 1993.

Zilles, S.N., "Catalog-Based Order Entry System," *IBM technical Disclosure Bulletin*, vol. 25, No. 11B, Apr. 1983, pp. 5892-5893.

"Digital Image Communications at the Practical Stage," *Nikkei Communications*, Nikkei BP, May 4, 1992, No. 125, pp. 31-37.

Ishii, "Multimedia System Which Will Exercise the Greatest Power in Business Use," *Nikkei Computer*, Aug. 12, 1991, No. 260, pp. 93-102.

Takahashi, Unipher, "Placing the Order After Checking Pictures of Goods With a Terminal at a Jewelry Store," *Nikkei Computer*, May 4, 1992, No. 280, pp. 80-90.

Hayes, Mary, "Videophone suits seek $110 million," *The Business Journal—San Jose*, Mar. 8, 1993, 2 pages.

Lam, Jenny, "Cosy offices," *The Straits Times Press Limited*, Mar. 4, 1993, 2 pages.

"Telecoms future: personal communication networks," *South China Morning Post* (Hong Kong), Feb. 24, 1993, 2 pages.

Troxler, Howard, "Cousin of cable—or just Big Brother?," *St. Petersburg Times* (Florida), Feb. 3, 1993, 2 pages.

Strattner, Anthony, "Video pictures: coming from a telephone near you; AT&T teams with CLI for chip sets that deliver video over phone; Compression Labs Inc.; Product Announcement," *Computer Shopper*, Feb. 1, 1993, 2 pages.

Baron, David, et al., "CLI demos video phone over ISDN; Compression Labs; Integrated systems digital network; News from CES and MacWorld; Brief Article," *Digital Media*, Jan. 18, 1993, 1 page.

"ShareVision Announces Share View TM Plus," *News Release*, Jan. 6, 1993, 1 page.

Behlim, Saara, "Patent of the month: They're all connected," *Crain's Chicago Business*, Dec. 14, 1992, 1 page.

P. Young, "But Will it Respect You Later?," *Sunday Mail (QLD)*, Dec. 13, 1992, 1 page.

Forster, Barbara, "'Videoconferencing' Evolving Into Valuable Business Tool," *Central New York Business Journal*, Nov. 16, 1992, 2 pages.

Maloney, Janice, et al., "Better than being there? Share Vision provides document sharing, livevideo and audio over standard phone lines.; ShareVision Technology Inc.'s technology for producing desktop visual communications systems," *Internet Media Strategies, Inc. Digital Media*, Aug. 17, 1992, 2 pages.
M. Ketchell, "Building Towards 2000," *Courier-Mail*, Mar. 10, 1992, 1 page.
"Visual communications systems offer high definition, cost," *The Nikkei Weekly* (Japan), Nihon Keizai Shimbun, Inc., Sep. 28, 1991, 1 page.
ALLIANCE Teleconferencing Services Boost Business Efficiency, 1988, Hazto, et al., AT&T Technology, vol. 3 No. 1, pp. 22-31.
Tempo MBX Feature Guide, 1989, ConferTech International, Inc.
General Description, Installation & Maintenance Practice, C1200 Computerized Teleconference Terminal, 1990, Westell, Inc.
Interactive Graphics Teleconferencing, 1979, Pferd et al., Computer, vol. 12, No. 11, pp. 62-72.
Behavioral and User Needs for Teleconferencing, 1985, Kenyon et al., Proceedings of the IEEE, vol. 73, No. 4; pp. 689-699.
Audio and Visually Augmented Teleconferencing, 1985, Watanabe et al., 73 Proceedings of the IEEE 4; pp. 656-670.
C1200 Computerized Teleconference Bridge, 1983, Westell, Inc.
General Transmission Considerations in Telephone Conference Systems, Mitchell, Doren, IEEE Transactions on Communication Technology, vol. COM-16, No. 1; Feb. 1968; pp. 163-167.
Packet Switched Voice Conferencing Across Interconnected Networks, 1988, Weiss et al., Proceedings of the 13th Conference on Local Computer Networks; 1 pp. 114-124.
Bridge on the River Telecom, May 1989, Teleconnect, v7, n5, 1 p. 110(4).
Implementation Mechanisms for Packet Switched Voice Conferencing, 1989, Ziegler et al., IEEE Journal on Selected Areas in Communications, vol. 7, No. 5, pp. 698-706.
LAN Based Real Time Audio-Graphics Conferencing System, Soares et al., INFOCOM '89. IEEE Proceedings of the Eighth Annual Joint Conference of the IEEE Computer and Communications, Societies, Technology: Emerging or Converging, vol. 2; Apr. 23-27, 1989; pp. 617-623.
Videomatic Switching: Systems and Services, Crawford et al., International Zurich Seminar on Digital Communications, 1988. 'Mapping New Applications onto New Technologies'; Mar. 8-10, 1988; pp. 37-43.
Real-Time Desktop Conference System Based on Integrated Group Communication Protocols, Sakata et al., Conference Proceedings, Seventh Annual International Phoenix Conference on Computers and Communications; Mar. 16-18, 1988; pp. 379-384.
Today's Teleconferencing and its Applications, Ryva, 33rd IEEE Vehicular Technology Conference; May 25-27, 1983; pp. 99-103.
A Secure Audio Teleconference System, Steer et al., IEEE Military Communications Conference, 1988. MILCOM SS. Conference record. '21st Century Military Communications—What's Possible?', vol. 1; Oct. 23-26, 1988; pp. 63-67.
Networking Requirements of the Rapport Multimedia Conferencing System, Ahuja et al., INFOCOM '88. Networks: Evolution or Revolution? IEEE Proceedings. Seventh Annual Joint Conference of the IEEE Computer and Communications Societies; 1988; pp. 746-751.
Technical Implications of Teleconference Service, McManamon, IEEE Transactions on Communications, vol. COM-23, No. 1; Jan. 1975; pp. 30-38.
Personal Multi-Media Multi-Point Communication Services for Broadband Networks, Addeo et al., IEEE Global Telecommunications Conference, 1988, and Exhibition. 'Communications for the Information Age.' Conference Record, GLOBECOM '88, vol. 1; Nov. 28-Dec. 1, 1988; pp. 53-57.
Multidisciplinary Applications of Communication Systems in Teleconferencing and Education, Coll et al., IEEE Transactions on Communications, vol. COM-23, No. 10; Oct. 1975; pp. 1104-1118.
ANI is the key to unlock advanced network services, Hegebarth, Telephony, v215.n20; Nov. 14, 1988; pp. 64-66.
AT&T plans 2 nationwide ISDN features, Electronic News, 1,v34. n1701; Apr. 11, 1988; pp. 21.

Cable operators fight back (pay-per-view TV), Stern, Dun's Business Month, v129; Feb. 1987; pp. 54-55.
Unscrambling PPV options (pay-per-view TV), Sukow, Broadcasting, v115.n8;Aug. 22, 1988; pp. 39-40.
Data peps up the old voice lines (voice data technology), Kulkosky, Wall Street Computer Review, v5.n12; Sep. 1988; pp. 53-59.
Calling Card Service—Overall Description and Operational Characteristics, Basinger et al., The Bell System Technical Journal, vol. 61, No. 7; Sep. 1982; pp. 1655-1673.
Calling Card Service—TSPS Hardware, Software, and Signaling Implementation, Confalone et al., The Bell System Technical Journal, vol. 61, No. 7; Sep. 1982; pp. 1675-1714.
Calling Card Service—Human Factors Studies, Eigen et al., The Bell System Technical Journal, vol. 61, No. 7; Sep. 1982; pp. 1715-1735.
Mass Announcement Capability, Frank et al., The Bell System Technical Journal, vol. 60, No. 6; Jul.-Aug. 1981; pp. 1049-1081.
Mass Announcement Subsystem, Anderson et al., The Bell System Technical Journal, vol. 60, No. 6; Jul.-Aug. 1981; pp. 1083-1108.
Hello, central; phone conferencing tips, Jaffe, Whole Earth Review, No. 65; ISSN: 0749-5056; Jan. 1989; p. 110.
Why not try "audio teleconferencing"?, Menkus, Modern office Technology, vol. 32; Oct. 1987; pp. 124-126.
Dial-It 900 Service Users Guide, AT&T.
AT&T teleconference offerings, 1987, Douglas, IDATE.
Tempo Audio Teleconferencing System Operating Manual, 1990, ConferTech International.
A History of Alliance Teleconferencing Service, Feb. 1990, Elfrank, AT&T.
A packet-switched multimedia conferencing system, Schooler et al., SIGOIS (ACM Special Interest Group on Office Information Systems) Bulletin, vol. 1 No. 1 10, pp. 12-22, Jan. 1989.
CDR 1024, "The ConferCall Service",1984-86, ConferTech International, Inc.
The New Tempo-MB, The Best Just Keeps Getting Better, 1986, ConferTech International, Inc.
Tempo MBX Product Information Sheet, 1989, ConferTech International, Inc.
Tempo MBX Feature Guide, "Conferee Features", 1989, ConferTech International, Inc.
Tempo MBX Summary of System Features, 1989, ConferTech International, Inc.
Darome's Model 3015/3030 Bridge System, Feature Description and offer for sale, Apr. 1986, Darome.
A Multiport Telephone Conference Bridge, Kuebler, IEEE Transactions on Communication Technology, vol. COM-16, No. 1 (Feb. 1968) pp. 168-172.
VCT Quarterly Newsletter, 1987.
Alliance Teleconferencing Services, AT&T, 1985.
Alliance Teleconferencing Services, AT&T Alliance Teleconferencing Services: A Guidebook to Effective Teleconferncing, 1984.
AT&T Alliance Teleconferencing Services—Call Set Up Cards.
European Patent Office Search Report, from EP Application No. 05015139.8, dated Nov. 13, 2009.
Gelman, A.D., et al., "A Store-and-Forward Architecture for Video-on-Demand Service," 1991 IEEE, pp. 842-846.
Gardner, W. David, "Computer Users Have Hundreds of Data Bases to Choose From," *Dun's Business Month*, Apr. 1983, pp. 99-100.
Veit, Stan, "The Computer Network Maze, Part 2: Concluding a description of how the various computer communications networks can be utilized to your best advantage," *Computers & Electronics*, vol. 21, No. 4, Apr. 1983, pp. 84-90.
Globecom '82, IEEE Global Telecommunications Conference, Conference Record vol. 3 of 3, Miami, Nov. 29 to Dec. 2, 1982.
Comp-U-Store System Could Change Retail Economics, Direct Marketing, vol. 46, No. 3, Jul. 1983, pp. 101-107.
Anonymous; "New replacement Service Saves Insurers Money, Satisfies Insured"; Canadian Insurance; Toronto; Aug. 1982; extracted on Internet from Proquest database.
Baran, Paul, Some Changes in Information Technology Affecting Marketing in the Year 2000, Changing Marketing Systems, 1967 Winter Conference, Dec. 27-29, 1967, pp. 76-87, No. 26. (or pp. 76-77).

Britton, David, "Being There—The Promise of Multimedia Communications", Technology Review, (May 16, 1992,) pp. 43-50, May/Jun. 1992.

Levine, Kay, Anchorage Daily News, Troubleshooter; [Final Edition 30]. Anchorage, Alaska. Jul. 16, 1991. p. B.2.

Nash, Edward L., "Direct Marketing, Strategy, Planning, Execution", 3rd Edition, McGraw-Hill, Inc., 1994, pp. 164-165, 364-367.

Peppers et al., "The One to One Future Building Relationships One Customer at a Time", © 1993, 1996, pp. 3-17; 40-43.

Resnick, Paul, GroupLens: An Open Architecture for Collaborative Filtering of Netnews, Proceedings of the ACM 1994 Conference on Computer Supported Cooperative Work, Abstract, pp. 175-186.

Robinson, Phillip; "Laptop and palmtop computers have disadvantages but also some nice pluses"; Austin American Statesman; Austin, Tex; Mar. 9, 1992 extracted on Internet from Proquest Database.

* cited by examiner

EXEMPLARY BUYER REQUEST FORM

```
DATE 12-7-93   TIME 8:45 AM PST   BUYER CO. FOOD 4 LESS   SPECIFIC BUYER LARRY ISHII

VIDEO UNIT 714 668 5335   YOUR REFERENCE # 5127   MERCHANDISE CODE 472361

GENERAL CATEGORY BASIC HEALTH AND BEAUTY AIDS   SPECIAL CATEGORY SHAMPOO & CONDITIONERS

SUBMIT PRESENTATION

REQUEST SPECIFICS
       CONDITIONING SHAMPOO FOR THE U.S. MARKET
       PAPAYA BASED
       12 OZ. BOTTLE
       UNDER $2.00 NET COST
       MUST BE AVAILABLE DELIVERED TO FULLERTON, CA BY 12-18-93, 8:00 AM PST
       MINIMUM 10,000 UNITS
       DATE/TIME OFFERS REQUIRED BY 12-7-93, 3:00 PM (PST)
```

*FIG. 9*

EXEMPLARY NOTIFICATION RECEIPT

```
YOUR #5127 RECEIVED, ASSIGNED TELEBUYER #681296
DISTRIBUTED TO 736 VENDORS
```

*FIG. 10*

COMMERCIAL PRODUCT ROUTING SYSTEM WITH VIDEO VENDING CAPABILITY

CROSS REFERENCE TO RELATED APPLICATIONS

This application is a continuation of application Ser. No. 09/371,212, entitled "METHOD FOR BUYER-SELLER ON-LINE COMMERCE" and filed on Aug. 10, 1999, now U.S. Pat. No. 7,848,496 which is a continuation of application Ser. No. 08/189,405, entitled "COMMERCIAL PRODUCT ROUTING SYSTEM WITH VIDEO VENDING CAPABILITY" and filed on Jan. 27, 1994, now U.S. Pat. No. 6,323,894, which is a continuation-in-part of Ser. No. 08/154,313, entitled "SCHEDULING AND PROCESSING SYSTEM FOR TELEPHONE VIDEO COMMUNICATION" and filed on Nov. 17, 1993, now U.S. Pat. No. 5,495,284, which is a continuation-in-part application of application Ser. No. 08/067,783, entitled "VIDEOPHONE SYSTEM FOR SCRUTINY MONITORING WITH COMPUTER CONTROL" and filed on May 25, 1993, now abandoned, which is a continuation-in-part application of application Ser. No. 08/031,235, entitled "VIDEOPHONE SYSTEM FOR SCRUTINY MONITORING WITH COMPUTER CONTROL" and filed on Mar. 12, 1993, now U.S. Pat. No. 5,412,708. The subject matter in all the above-identified co-pending and commonly owned applications is incorporated herein by reference.

FIELD OF THE INVENTION

The present invention relates generally to the field of computerized telephone and video communication, and more particularly, to a communication traffic control system for providing video communication through a dial-up telephone system, for selectively interfacing members of plural groups, for example, wholesale buyer groups and vendor groups. Such a system may be used in a variety of applications, such as for directing and exchanging offers and responses at the wholesale level, between selective members of plural groups, for analyzing and compiling data, scheduling and implementing conferences, consummating sales and the like. It is currently contemplated that the present invention may be used, for example, in merchandising applications, including purchasing, selling, marketing or the like, educational conventions for medical doctors and other professionals, game shows, dating services and so on.

BACKGROUND OF THE INVENTION

Over the years, integration of computer and telephone technologies has brought many advances in the telecommunication industry. Functionally integrating human operators with telephone network capabilities, voice and data switching capabilities, computer applications and databases, and voice processing technology not only provides human operators with immediate access to information from a wide variety of sources, but allows them to intelligently process each call as well. Telephone switches are linked with computers to coordinate computer information and intelligence with call handling capabilities to automatically add relevant data, as well as facsimile, graphics, video or audio communication capabilities. Select services or equipment such as automatic number identification (ANI) or dialed number identification service (DNIS) enhance calls and human capabilities by forwarding identifying information preceding a telephone call, thereby, eliminating steps otherwise performed by people to capture information regarding the caller. For applications involving large scale processing of calls, switch and host databases automatically link calls with a caller's record, eliminating the need for the caller to enter an identification number when using a voice response system.

More revolutionary applications use ANI to simultaneously pass both the call and the caller's current record to an operator's telephone and terminal. This obviates the need for a person to obtain, enter and receive the caller's record from the database. Such advances have immensely enhanced human capabilities for communication, data manipulation and control functions.

Somewhat concurrently, rapid developments in computer, telephone and video technologies have introduced the concept of visual communications or video conferencing. In particular, efforts at integrating these technologies have gained enormous momentum in recent years, resulting, in part, from a general desire in all industries to conserve time and expenses, and thereby, maximize human efficiency and productivity. The advent of videophones has enabled users to visually communicate from remote locations. Many industries are rapidly embracing the idea of video conferencing or visual communication to eliminate escalating travel expenses. Employees or customers in different places can take part in interactive training sessions or seminars with no loss of time for travel.

However, obstacles remain, particularly in traditional areas of cumbersome communication. Still, with developments, virtually every industry segment can profit from interactive data sharing in real time with the added advantage of face-to-face communication. Innovative technical advances are fast satisfying promises of enhanced capabilities, thereby, allowing users to share and manipulate images from remote locations, such as pictures, graphs, maps or the like.

Technical breakthroughs in audio and video compression technology make desktop video conferencing and visual communication both economical and practical for everyday business communications. To fully participate in video conferencing, the user's equipment must communicate with similar units, albeit, from different equipment vendors. The International Telephone and Telegraph Consultative Committee (CCITT) has defined a standard called H.261 (or "Px64") detailing how video and audio signals are compressed and decompressed for transmission across a common link. At present, no one industry standard and format has been adopted for video conferencing systems. Thus, the systems available on the market are not always compatible. As a consequence, many different types of video codecs (coders/decoders) are currently in use. For example, the AT&T AVP CODEC is a three-chip set that digitally processes high quality, full motion video images and sounds that are compatible with the latest videoconferencing standards.

At any rate, ongoing efforts at achieving compatibility and providing compression schemes that can transmit color images over POTS (plain old telephone system) all over the world are in the offing. Approaches for incorporating live-action, color video with standard voice telephone lines via networks and modems are currently being introduced. By using a suitable video capture board and a modem, live video may be received and displayed on any 386 or 486 personal computer running Microsoft Windows™. The frame rate depends upon the type of display and type of communication hardware. For example, over a normal dial-up telephone line, a computer with a VGA (video graphics array) display set at 32,000 colors, a 486 CPU and a 14.4 kbs (thousand bits per second) modem can achieve a frame rate of 5 frames per second. The link between the personal computers can be established in several ways, for example, by a modem, LAN (local area network), serial port and other high speed digital links.

To consider an example of cumbersome communication in the merchandising industry, wholesale vendors or sellers of goods typically spend many hours attempting to schedule appointments with various buyers for different organizations, travelling to and from the buyers' facilities, and waiting for meetings, which may sometimes last only a short duration. Unfortunately, considerably more time and expense is incurred, in travelling to and from different facilities, than is desirable. Moreover, as a practical matter, specific vendor sales people are typically assigned to merchandise specific goods and interact with specific buyers, resulting in a need for more vendor personnel dedicated to particular buyers.

Moreover, in the event a specific seller wishes to broadcast a special offering of a particular item to plural buyers, for example, to dispose of an inventory of distressed items, the seller must undertake considerable effort, such as place an advertisement or otherwise initiate contact with buyers. An advertisement is likely to be viewed only by random buyers, thus, not always proving to be a reliable method of soliciting offers from all possible buyers. Moreover, initiating individual contact with a series of buyers, until eventually securing a final sale, constitutes an arduous task. Similarly, in situations where a buyer wishes to solicit proposals from vendors for a particular item, the same practice prevails.

Accordingly, the present invention recognizes the need for a system to communicate with remote locations over a widely distributed area, from other places, such as a central location, for the applications discussed above as well as many other diverse applications with similar requirements. In particular, the present system recognizes the need for directing and exchanging communications, such as offers and responses, between select members of plural groups or sub-groups, analyzing and compiling data relating to such members, scheduling appointments, implementing face-to-face conferences (in real-time), and consummating transactions and billing relating to transactions between such groups.

SUMMARY OF THE INVENTION

Generally, the system of the present invention involves traffic regulation and control for video communication between a plurality of remote, widely distributed locations, from a central unit, utilizing dial-up telephone facilities in today's computer environment, and with voice quality lines. Specifically, for example the dynamic graphics of telephonic video (on standard analog lines and digital lines over Integrated Services Digital Network (ISDN)) facilitate videophone, while video still displays and digital lines facilitate high fidelity (hi-fi) video displays along with audio capabilities, all combined with the interactive capability of computers to attain an effective commercial product routing system with video vending capability.

The system of the present invention contemplates applications ranging from merchandising (including purchasing, selling, marketing or the like) to educational conventions for medical doctors and other professionals, game shows, dating services and so on. The present system is configured to direct and exchange communication traffic, for example, in the form of offers and responses, between selective members of plural groups or sub-groups, such as vendors and buyers, for analyzing and compiling data, scheduling appointments and implementing visual conferences, consummating transactions and the like. Selective routing of communication traffic from a central unit or controlled by the central unit effectively prevents information overload.

In one disclosed embodiment of the present invention, personal computers equipped with capabilities for providing either analog video (analog motion and analog high resolution freeze frame) or digital video or both, and speakerphones (or regular telephone instruments), for one-way or two-way communication are placed at each of a plurality of remote locations to communicate with a central unit that may include several communication and control stations also equipped with some or all of the same capabilities. As a part of traffic control operations, a video display (depicting motion and color) may be provided with graphics, audio and data signals, at each communication and control station, as well as, the remote locations. The personal computers may utilize well known image enhancement techniques to facilitate high resolution images for closer observation.

In accordance with one exemplary embodiment related to wholesale merchandising, a telephonic interface appointment scheduling and routing system includes a central traffic control system, independently managed by a third party and located remote from all vendors' and buyers' facilities. The central traffic control system schedules appointments and routes offers and responses to and from select members of plural groups, such as buyers and vendors, to expedite traditionally complex purchasing operations. Routing of offers and responses may also take place between members of subgroups of plural groups. Calls may be classified into types, for example, a vendor with a special offering, a buyer responding to a special offering, a buyer soliciting proposals, a vendor responding with a proposal and a vendor or a buyer seeking an appointment. Calls of the various types may involve some form of qualification or approval. For example, access to the system may be limited to qualified or registered entities. Also, certain limitations may be imposed, such as calls revealing one vendor's proposal to a competitor are inhibited.

In accordance with an example, a vendor may wish to broadcast a special offering of a particular item to interested buyers. The routing system analyzes buyer data, typically acquired during registration, and compiles a list of buyers to whom the broadcast is transmitted. Special buyers may be specified by the vendors making the special offering. For example, a vendor may designate special buyers from a list of all participating buyers and vendors provided to each registered member. From time to time, periodic updates on new members may be circulated.

To facilitate equitable routing of special offerings to all interested buyers, in situations, where there are only a limited number of communication lines, the routing system may include a random number generator to randomly select subsets of buyers and may transmit the broadcast in sequence to each subset. In some situations, the routing system may have the capability to request and add additional communication lines in the event a caller (vendor or buyer) desires concurrent broadcast to all potential receiving parties. Of course, in such cases the caller would incur the additional charges. A numbering system may also be adopted, whereby broadcasts are transmitted to subsets of a designated number of buyers (for example, equal to the number of communication lines) in rotating sequence. For example, a particular special offering may be broadcast first to subset number one, then subset number two and so on, while the next special offering may be broadcast first to subset number two, then subset number three and so on. A video recording of the offered item may be stored in a video file server at the central location, thus, allowing interested buyers to view the item prior to making a purchase. Likewise, buyers may wish to solicit proposals for a particular item from vendors qualified for designated merchandise. Communication between the routing system and the different buyers and vendors may be accomplished in a variety of ways, as for example, by electronic-mail (transmission of messages across a network between two desktop PCs), electronic bulletin boards, on-line computer services (such as Prodigy® or CompuServe®), facsimile, voice-mail or the like.

Vendors and buyers may directly communicate with the central traffic control system to seek or change appointments and update information with respect to appointments with specific buyers. In accordance with one scenario, vendors may call the central traffic control system and, upon qualification, schedule appointments with specific buyers.

Appointments may be executed, on command, from a buyer location or the central traffic control system. Communication may be initiated conforming to the display capabilities at the vendor site. That is, as disclosed, the central traffic control system or alternatively, plural coordinated such systems (located at one site or plural sites), as well as, the buyer locations, incorporate multiple video format capabilities along with a bridge or switch unit to drive a display unit or monitor in a selected format in accordance with the capabilities of the current vendor. As disclosed, a single monitor may accommodate several formats or plural monitors can operate selectively for concurrent multiple displays.

A sequence of scheduled appointments may be developed, as programmed along with intervals of video communication. A record of the scheduled appointments is maintained by the central traffic control system.

At the appropriate times, identification designations for remote locations are provided in sequence, to address a memory for fetching telephone numbers and/or graphic display data also recorded when the appointments are scheduled. Accordingly, in sequence, vendor locations are dialed up via the public telephone system, either manually or automatically, to obtain audio-video communication providing an image of the vendor and the surrounding area at a specific vendor location.

Additionally, data associated with a vendor (or a buyer) may be graphically displayed for convenient reference. For each scene display with respect to a specific vendor, the graphic display of pertinent data provided may, for example, indicate the telephone number, the PIN number, the video format, vendor rating, current vendor delivery status and so on.

Special controls such as a mouse may be instituted enabling manifestations at the vendor location to initiate action or alter the display. Special operations also may be commanded through the videophone, video still (high quality) or high fidelity (hi-fi) video means either on manual initiative or automatically by automatic apparatus.

A video recorder and/or video printer may be located at a remote vendor location, central traffic control station or buyer location for selectively or continuously obtaining a video recording or video printout of displays.

Multiple coordinated central traffic control stations may be employed to communicate with widely distributed vendor or buyer locations with capabilities to route calls to each other, in the event that all of the communication lines are occupied and there is a considerable backlog of calls. Calls may be routed to the next available operator (buyer), for example, in the event appointments scheduled for a particular buyer last longer than contemplated, or another buyer familiar with that line of products may step in and handle the appointment.

Under some circumstances it may be desirable to prioritize calls. For example, appointments may be queued in sequence, specific appointments may precede other routed appointments in accordance with an override feature.

A record of the number of calls and related charges incurred by the buyers for appointments is maintained, which may be analyzed and ultimately rebilled to the vendors. Of course, charges for scheduling are incurred directly by the vendors. Also, a record of charges incurred for each caller (buyer or vendor), depending upon the transaction initiated, may be maintained and billed to each caller.

These as well as other features of the present system will become apparent from the detailed description which follows, considered together with the appended drawings.

BRIEF DESCRIPTION OF THE DRAWINGS

A complete understanding of the invention and its advantages may be gained from consideration of the following description of some disclosed embodiments taken in conjunction with the accompanying drawings, in which:

FIG. 9 is an exemplary form indicating a buyer's request; and

FIG. 10 is an exemplary message transmitted from the central traffic station to a buyer or a vendor.

DETAILED DESCRIPTION OF THE PREFERRED EMBODIMENTS

As indicated above, a significant aspect of the scheduling and routing system of the present invention is based on recognizing that a dial-up public telephone system may be effectively utilized for visual communication and conferences between a plurality of remote locations regulated and controlled by a central traffic control station. More specifically, it has been recognized that for an effective communication traffic control system, dial-up voice quality lines, such as standard analog or digital lines, may be employed variously in conjunction with videophone equipment, computer facilities (personal computers (PCs) with video capabilities) and various forms of telephonic equipment as voice generators, auto dialers and D-channel or in-band signalling apparatus.

Figure 1:
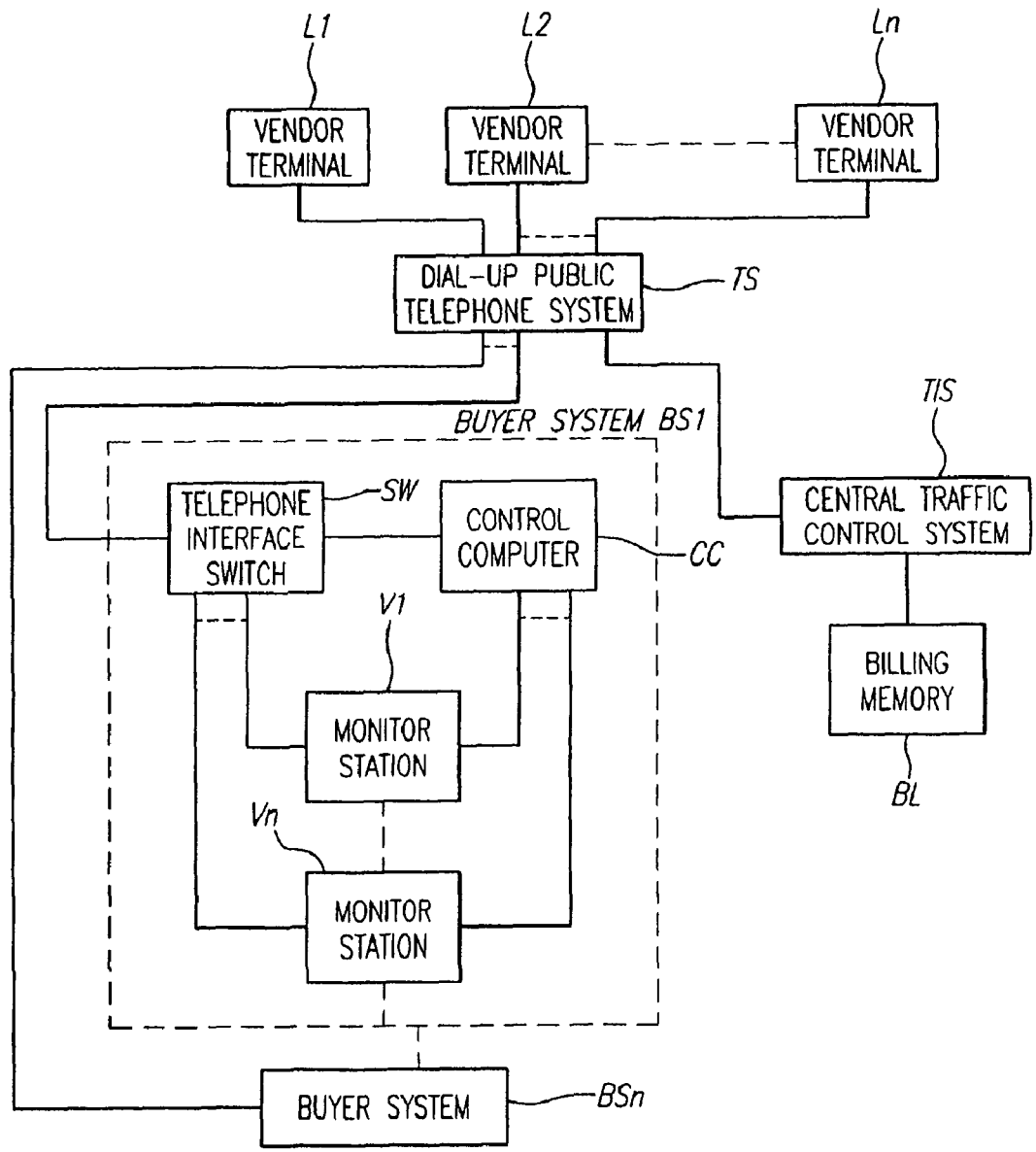
FIG. 1 is a block diagram of the system in accordance with one embodiment, illustrating a telephonic interface appointment scheduling and routing system.

To that end, a dial-up public telephone system TS is illustrated in FIG. 1 (upper center) affording effective communication between a plurality of remote locations, for example, locations L1-Ln representing vendor sites, and at least one central traffic control station TIS. For merchandising applications, the remote specific vendor locations communicate with the central traffic control station TIS, which is located remote from the buyers' and vendors' facilities.

As a buyer example, XYZ Drug. Company (a large chain) may employ individual merchandise buyers responsible for purchasing specific categories or sub-categories of items. For example, one buyer (person) may be responsible for purchasing body treatment products, such as skin and hair products, another buyer may be responsible for purchasing vitamins and over the counter medications, and yet another for purchasing magazines and toys, and so on. The present system facilitates selective transmission of communications between individual buyers of plural buyer groups or sub-groups and qualified members of plural vendor groups or sub-groups. For example, special offerings by vendors for particular merchandise may be transmitted only to buyers designated for purchase of the merchandise. Likewise, buyer requests for proposals on select merchandise are transmitted only to vendors designated to sell the merchandise. Similarly, appointments for conferences may be scheduled by vendors or buyers, although in keeping with present merchandising practices, it is generally contemplated that vendors would pursue scheduled appointments. However, appointments are generally verified by buyers and appointment execution calls are generally initiated by buyers, either directly or automatically using autodialers.

A fully automated interactive voice response system including ARUs (audio response units) may schedule appointments for specific buyers and subsequently, load schedules for all the buyers into a memory at the central traffic control station. Alternatively, each specific buyer's schedule may be transmitted to and loaded into a memory at each buyer terminal. In some instances, vendors may communicate with the traffic control station in any of a variety of ways (touch-tone, electronic-mail, voice-mail, facsimile or the like) to make and/or verify appointments and/or initiate the conferences, if necessary. In addition, buyers may also communicate with the traffic control system to approve appointments, or otherwise update information in any of a variety of ways (touch-tone, electronic-mail, voice-mail, facsimile or the like). During visual conferences (in real-time), vendors may display their goods, packaging or promotional displays and otherwise effectively communicate with the buyers.

Along with a video signal display (real-time, color, motion, freeze frame), under manual or computer control, audio and data signals are employed to supplement and enhance conferencing operations. In an exemplary system, each of the vendor locations may incorporate several video speakerphones (with one-way and two-way communication and echo canceling), a camera (separate cameras also may be used to concurrently provide images for a videophone and high quality still images), switches, automatic dialing devices and computer memory capability for initiating and responding to commands from the central traffic control system, as well as, for initiating various actions to accomplish change or to accommodate special circumstances.

Conventionally, in merchandising applications, it is appropriate for the vendors to incur communication expenses. To facilitate this, a reduced rate service for long distance outbound calling, for example MEGACOM, may be installed at each of the buyers' facilities. Data on calls made by the buyers may be obtained from the telephone company (e.g., AT&T telephone company) and analyzed to isolate calls made to each specific vendor and thus, the cumulative charges incurred may be computed. For example, outgoing call activity may be monitored at each of the buyers' facilities or the independently managed, central traffic control site and rebilled to specific vendors.

Alternatively, toll free or "800" services at each of the vendor locations may be installed, and "800" number calls initiated by the buyers may be billed to each of the vendor locations. Further, the central traffic control system may include a central detail service to contract for and install telephone services at both the buyer and vendor locations, in order to obtain and report on calls to and from the buyers, as well as, centrally bill both buyers and vendors for all video telephone communications.

Considerable other data may be developed and stored. For example, the central traffic control station for each buyer facility may maintain a record of outbound calls made by all the buyers located at that facility including data, such as the date and time of the call, the name of the buyer initiating the call and the duration of the call. Accordingly, information for each buyer may be subsequently compiled. Likewise, the central traffic control station may maintain a record of all the calls made by each vendor. For example, a specific organization may wish to ascertain the number of vendor calls to a particular buyer. Accordingly, the central traffic control station may compile such data by comparing vendor outbound calls with a database of buyers (including information, such as telephone numbers, names etc.).

Furthermore, in some cases, a summary of each buyer's efficiency may be recorded and provided to interested parties. For example, a buyer's efficiency may be ascertained by the number of video calls made by a specific buyer every week, the average length of the video call, and other data displayed from the database, namely, name of the vendor, names of the persons participating in the call, and so on. For example, for a particular buyer a summary could indicate that during the week of Mar. 20, 1993, forty calls were made for an average length of twenty minutes. Detailed information may further indicate that specifically at 10:00 a.m., on Mar. 20, 1993, a first appointment with Mr. John Blow, of ABC Fruit Company was initiated, which lasted for 1 hour and 12 minutes, and at 11:12 a.m., a second appointment with Ms. Mary Smith of XYZ Cutlery Company lasted 11 minutes and so on.

The central traffic control station TIS may automatically place a call (for example, to broadcast a proposal request from a buyer) to the appropriate vendor locations, determined by a database of vendor locations qualified (for example, as by specific category or sub-category) for the particular merchandise for which the buyer requests proposals. Likewise, when executing appointments, the buyer may place a call to the appropriate vendor location, determined also by a database associated with the particular one of the vendor locations L1-Ln, with which the specific buyer has an appointment scheduled. Alternatively, the buyer may actuate an autodialer, such that the autodialer code number (obtained from the central traffic control station database) displayed on the buyer's video terminal connects him or her to the appropriate vendor. In the event there are complications or otherwise, the buyer may use a regular telephone or a cellular telephone and manually dial the telephone number displayed on the video terminal. It is currently recognized that cellular transmission will ultimately provide dynamic motion and high resolutions freeze frame displays.

The illustrated embodiment of FIG. 1 shows the independently managed, central traffic control system TIS (right), located remote from the buyer systems illustrated at BS1-BSn and the vendor terminals L1-Ln. Under control of the central traffic control system TIS, communication is provided through a dial-up public telephone system TS, between the vendor terminals L1-Ln and the buyer systems BS1-BSn. The buyer system BS1 is shown in some detail, specifically, as including a telephone interface switch SW coupled to a control computer CC for regulating a plurality of monitor stations V1-Vn.

Preliminarily, considering an exemplary sequence of operations with reference to FIG. 1, assume that different vendor terminals L1-Ln are equipped with videophone, video still (high quality) or hi-fi video capabilities. Alternatively, the vendors may have desktop personal computers incorporating live-action, color video with standard voice telephone lines via networks and modems.

Each buyer system BS1-BSn may be equipped with a platform to accommodate select communications with various vendors. Assume that a person at vendor location L1 wishes to schedule an appointment with a buyer at buyer terminal V1. As a result, telephone equipment at the location L1 is actuated, either manually or automatically, prompting dial-up operations to accomplish a connection from the vendor location L1 through the telephone system TS to the traffic control system TIS. Standard information, as the specific buyer with which the vendor may be entitled to schedule an appointment may be indicated by dialed number identification signals (DNIS) using a capability readily available from the telephone system TS, as for example on the so-called D-channel. It is to be noted that while the D-channel apparatus provides one operational configuration, some DNIS and/or ANI (Automatic Number Identification) data signals can be received in-band without D-channel apparatus. In any event, such signals may direct or qualify communication under control of the system TIS. It should be noted that DNIS and ANI signals can be used for identification, whereby the control computer CC may fetch identification data for graphic displays.

As another feature, an incoming line can be designated at the central traffic control system, such as an "800" line to receive calls from any telephone (pay-phone, vendor location or the like) to prompt scheduling. For example, a call on the "800" line may be answered by an interface or an operator to schedule an appointment with a specific buyer or vendor. The vendor might be specified by ANI signals when calling from a specific vendor location. Accordingly, a vendor can simply call the designated number from any telephone to enter the scheduling program.

For scheduling purposes, PIN numbers (personal identification numbers) are assigned to vendors. The PIN number may be coded to indicate the specific organization that a vendor is associated with. Alternatively, a database of PIN numbers correlating to specific organizations may provide that information. Entry of a PIN number by a vendor may qualify a vendor for contact with a select buyer. Initiating contact also may be controlled by a clock, for example, some communications might be limited to the hours between 7 a.m. and 12 p.m. Additionally, other specifications may be designated for specific groups of vendors. Thus, the system may be configured such that DNIS and ANI communication features cross reference with the clock, prior to answering. For example, if the present time is between 5 p.m. and 7 p.m., only select vendor calls are accepted. Some vendors may be accorded priority status allowing them to schedule appointments for select priority days, for example, Thursdays. Similarly, priority status may be accorded to vendors offering distressed merchandise at discount rates.

Figure 7:
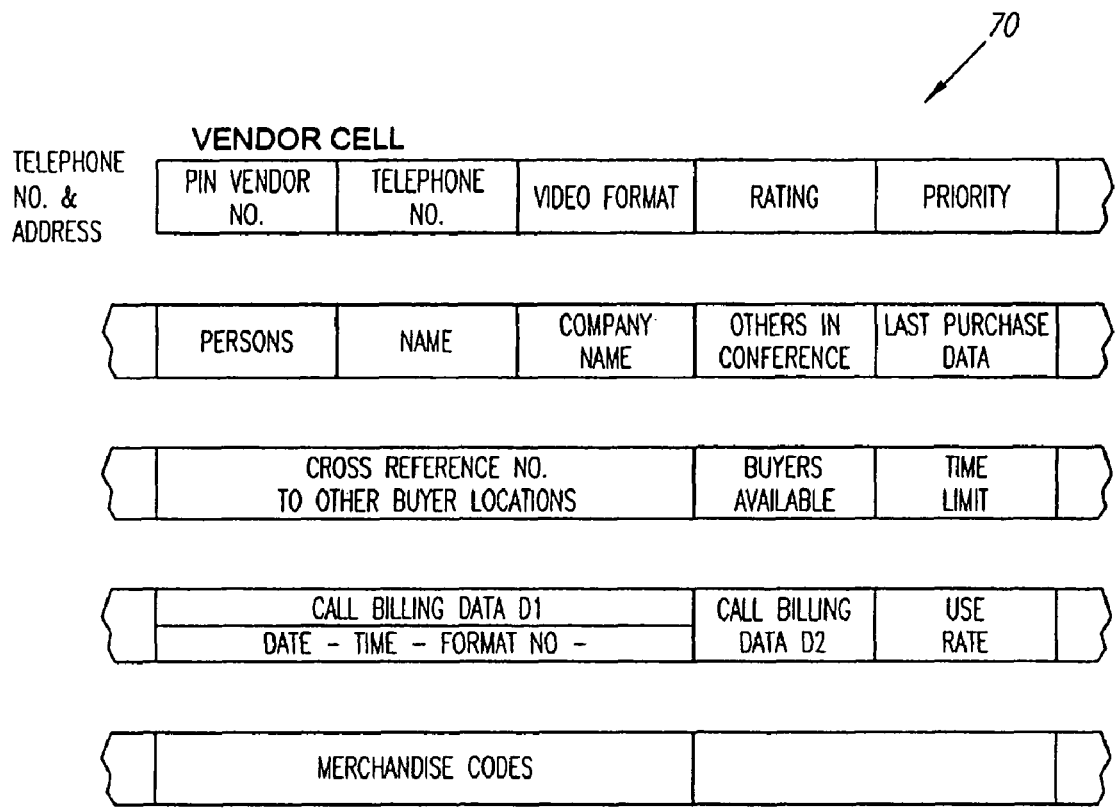
FIG. 7 is a fragmentary diagrammatic representation of an exemplary storage cell for information specific to a vendor, as may be formatted in the system of the present invention.

As described in detail below, a priority field stored in the vendor's cell VC (FIG. 7) may incorporate a use-rate component, whereby extent of use by vendors may be controlled. That is, FIG. 7 illustrates exemplary storage cells of the traffic control system TIS, wherein information specific to each vendor and buyer, such as the telephone number, graphic data, merchandise codes, schedules and the like may be stored. For example, a vendor cell VC may be accessed by the telephone number and address to obtain information such as the vendor PIN number, telephone number, video format and so on. In some formats it may be desirable to designate a rating for each vendor indicating dependability, efficiency at delivering, credit worthiness, specific buyer organizations with which the vendor is registered etc.

Furthermore, to indicate an established relationship, a designation indicating priority may also be stored to isolate a particular vendor from a plurality of vendors selling similar goods. Of course, the vendor cell VC may also indicate the vendor's name, any relevant personal information, the company's name, other persons participating in a conference and so on. Similarly, data relating to the last purchase may also be of importance to some buyers.

With the central traffic control system TIS interacting with a plurality of widely distributed vendors and buyers, a cross reference number identifying transactions with other buyers may be of importance. Moreover, a record of the buyers available and the time limit for each buyer is also recorded. Similarly, the priority designation or status accorded to a vendor for any of a myriad of reasons may indicate, for example, that a particular vendor has distressed merchandise for sale at discount rates. Also, vendors that are not registered may be able to obtain appointments with buyers or buyers' assistants for predefined short periods of time, for example, five minutes.

To ensure effective and proper directing and exchange of traffic, for example, special offers by vendors and responses thereto by buyers, requests for proposals from buyers and responses thereto by vendors, or the like, merchandise codes that apply to each wholesale vendor and wholesale buyer are recorded. The merchandise codes, discussed in more detail below, regulate communication and avoid information overload, as by providing an indication of the type of products that each particular vendor or buyer is authorized to sell or buy.

Figure 8:
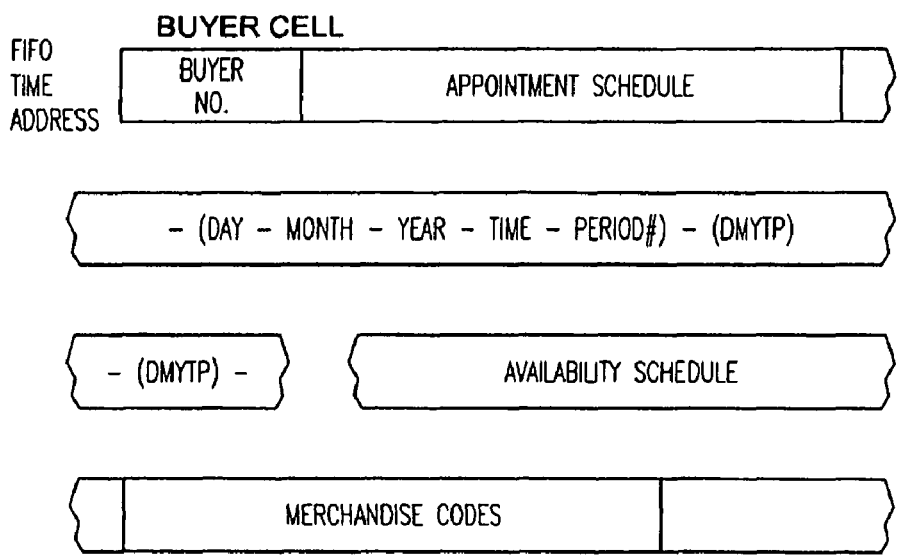
FIG. 8 is a fragmentary diagrammatic representation of an exemplary storage cell for information specific to a buyer, as may be formatted in the system of the present invention.

It should be recognized that appointment schedules also stored in vendor and buyer cells VC and BC (FIGS. 7 and 8), respectively, may be revised and updated on site by the traffic control system. For example, considering a situation where a last minute cancellation or change with respect to a schedule, special offering, request for proposal or proposal is necessary, changes, cancellations or updates to any of these transactions may be requested remotely by vendors and buyers alike. Moreover, vendors or buyers may wish to add pertinent information during visual conferences (real-time) simply for storage in the cells VC and BC or otherwise for subsequent processing.

To recap, under control of the traffic control system TIS, the dial-up public telephone system TS affords effective communication between the remote locations L1-Ln and the buyer systems BS1-BSn. Each buyer system located at a buyer's facility includes a telephone switch SW, through which incoming calls are received and outgoing calls are placed. Incoming data signals (DNIS and ANI) are passed to the internal control computer CC to select an appropriate one of the terminals V1-Vn to handle the call. For example, a station V1 might be assigned to buyer Tom Jones at XYZ Drug company, responsible for purchasing vitamins and over the counter medications. In addition, the computer CC also provides computer graphic signals to monitor station V1 supplementing the coupled television display, for example, to provide a composite display of a scene at location L1 along with appropriate graphic data. To consider the operation of the total-system embodiment in somewhat greater detail, reference will now be made to FIG. 2 in which previously identified components bear similar reference numbers. Preliminarily, it should also be recognized that certain basic components illustrated only at the central traffic control site TIS, such as memory, data storage, auto dialers, printers, VCRs etc., obviously may also be found at the buyer sites.

In the illustrated embodiment, the central traffic control system TIS directs and exchanges on-line and off-line traffic between the vendor and buyer sites, in the form of special offerings, proposals etc., as well as accepting appointment requests from either the vendor or the buyer sites. Appointment requests are generally initiated from the vendor locations L1-Ln. Subsequently, buyers initiate communication with specific vendors in accordance with scheduled appointments at the appropriate times.

The central traffic control system TIS may initiate contact with the vendor locations L1-Ln or the buyer locations V1-Vn (in predetermined sequence or randomly) to afford communication with the designated vendor or buyer. For visual conferences, buyers may initiate contact with the appropriate vendor locations L1-Ln also in sequence, such as when scheduled, or in some instances randomly.

Figure 2:
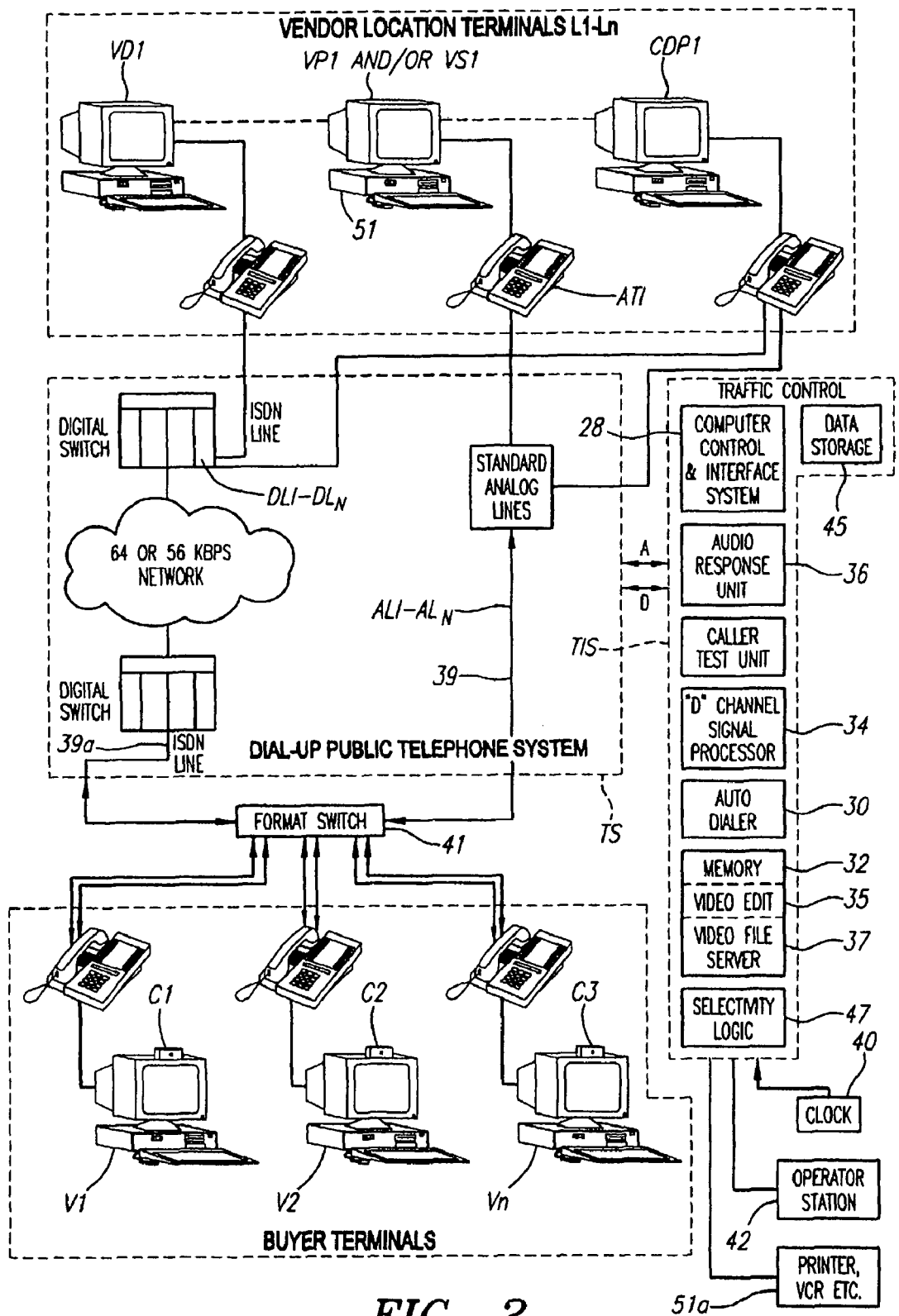
FIG. 2 is a more detailed block and pictorial diagram of the system of FIG. 1, illustrating the basic components of the scheduling and routing system.

As illustrated in FIG. 2, different vendor locations may have different communication capabilities, as represented by terminals VP1, VS1 for analog telephone communication capabilities over standard analog lines (static, videophone or PC), terminal VD1 for digital video capabilities over ISDN lines, and CDP1 for a combined terminal for analog and digital communication capabilities. For illustration purposes, FIG. 2 shows one telephone (see CDPI) as exhibiting both analog and digital communication capabilities.

The videophone terminal VP1 may be a unit available from AT&T, such as the Videophone 2500, or one available from MCI. A form of the digital video system VD1, for example, the NCR PVS-70 system also is available from AT&T/NCR and is recognized to provide high quality images. A static video system VS1 may be AT&T's PICASSO™ still image phone, which transmits "picture perfect" still color images and voice simultaneously in just a matter of seconds. By pushing a button on the PICASSO™ phone, a still image for a camcorder or electronic camera may be captured and, by pushing another button, that picture may be transmitted to another PICASSO™ phone. Such a video static system connects to standard analog telephone lines and is compatible with a wide range of video technology used in daily communication and industry standard camcorders, electronic cameras, mouse devices, document scanners and photo CD players. Accordingly, full-color images, virtually of any type, size or dimension may be transmitted for display on a TV, LCD panel, PC monitor or video monitor. Images may be stored or printed using a PC interface.

FIG. 2 also illustrates representative operator (buyer) terminals V1-Vn, coupled to the traffic control system TIS. Of course, all the operator terminals, as well as, the central traffic control system may be compatibly configured. Note that different videophone systems, rely on their own proprietary codecs, sometimes with more than one as an option. Generally, the operator terminals have the capability to accommodate videophone operation along with telephone switching and a variety of control functions.

The central traffic control system TIS includes a computer control and interface system 28 coupled to several operating devices including an auto dialer 30, a memory 32, a "D" channel signal processor 34, an audio response unit (ARU) 36 and a caller test unit 38. These structures and their interconnections are disclosed in greater detail below.

The computer control and interface system 28 also is connected to a clock 40 and an operator station 42. The clock 40 may control scheduling operations as explained above. For example, updates or changes to appointments, such as cancellations, may be remotely implemented (for example, via the central traffic control system) and forwarded to the appropriate buyer in a variety of ways, such as facsimile, electronic-mail, voice-mail or the like. The clock 40 may likewise monitor time limitations, as when special offerings and proposals are only valid for defined intervals of time.

With the live operator station 42, calls from vendors seeking appointments, making special offerings, or alternatively, calls from buyers seeking appointments or proposals, may be transferred to a human operator, in the event there are complications with the automatic response units or message recording equipment or in the event callers are calling from a rotary telephone. Some vendors or buyers may always prefer telephone communication with a human operator at some level.

As indicated above, flexibility to accommodate various vendor equipment configurations is an important aspect of the central traffic control system TIS and the operator terminals V1-Vn. In that regard, it should be recognized that even though only the buyer operator terminals V1-Vn are shown coupled to a format switch 41 (lower center), the central traffic control system TIS also has some form of a format switch, shown as part of the video file server. The format switch 41 selects a compatible one of analog video circuits and static video circuits (on analog communication lines) and digital video circuits (on digital communication lines) for driving one or more monitors incorporating such specific circuits. Each of the video monitors V1-Vn carry a camera C1-Cn which may variously facilitate dynamic motion images and still images. The format switch unit 41 can switch a single analog line 39 (from analog lines AL1-ALn) to couple to either videophone circuits or static video circuits or a digital line (or lines from digital lines DL1-DLn) indicated at 39a to couple to digital video circuits. Note that two lines are typically required for digital video, one for audio and one for digital data. Alternatively, the audio line may also serve as the analog line.

A video recorder (VCR) also may be provided, indicated generally at 51a, which may be set to record continuously or intermittently, to provide historical data for subsequent reference when conferring with a supervisor or refreshing the memory with respect to specific features. Alternatively, a video printer, also indicated at 51a, may be used. On receiving a request command, for example from the traffic control station TIS, the video recorder may record compressed video signals of the display images. Of course, continuous recording by the video recorder may be suspended when desired.

At locations where more than one camera is positioned, a single video recorder may be connected to the multiple cameras via a switching device to control and sequence the recordings from the cameras. A switching device such as the intelligent sequential switcher manufactured by SONY, as Model No. YS-S100, may be used to control and sequence multiple recordings. In addition, plural video recorders, such as separate video recorders for recording images transmitted on digital or analog lines may be connected.

In some situations, select frozen frames of viewings of vendor products or a specific time period of each viewing of a vendor product may be recorded on a VCR or printed using a video printer, for example two seconds (specific time period) of a twenty minute appointment for each vendor location. Such video printing may be obtained both by buyers and vendors.

Likewise, the operator terminal V1 (or the vendor location or the central traffic control system), for example, may incorporate a standard line printer for providing a printed record of predetermined vendor communications, e.g., indicating the date, time, location, period of appointment etc. Thus, a detailed hard-copy record is available when desired.

The traffic control system TIS also includes within a memory 32 or separate therefrom, a video EDI 35 for storing EDI software (Electronic Data Interchange facilitating direct computer-to-computer exchange of forms) or the like. It should be recognized that the buyer terminals V1-Vn may also have EDI software or the like stored in memory, by virtue of which, easy access to and exchange of forms is facilitated. The traffic control system TIS also includes a video file server 37, where vendors and buyers may deposit a video recording of a product being offered by a vendor or alternatively, desired by a buyer. A block indicated at 45 and labeled "data storage" stores standard system and network software. Selectivity logic, indicated at 47, to prevent information overload selectively directs communications between members of plural groups or sub-groups, such as wholesale buyer and vendor groups. Operations relating to the selectivity logic 47 are discussed below.

At this stage, consider an initial phase of a vendor scheduling an appointment. In that regard, select vendors are given advance notice of calling numbers and operating instructions. Accordingly, consider an exemplary operation sequence from the vendor telephone AT1 (FIG. 2). Thus, the vendor initiates dial-up operation with the central system TIS, seeking to schedule an appointment with the specific buyer. With a connection, a called number is indicated by Dialed Number Identification Signals (DNIS) utilizing facilities readily available and provided by the dial-up telephone system TS through the so-called D-channel apparatus 34. Thus, the central traffic control system has a basis for determining if, by reason of dialing the called number, the vendor is entitled to make an appointment with a specified buyer. A PIN number entered by the vendor may also qualify a caller (vendor).

The dial-up telephone system TS also provides Automatic Number Identification (ANI) signals indicating the calling number on the so-called D-channel apparatus 34. In various operational phases of the present disclosed embodiment, such signals identify the remote vendor location L1 to the central traffic control system TIS. Using such information, the memory 32 may provide alternate forms of calling signals, commanding a specific outgoing line from the telephone interface and control unit 28 to afford additional communication. Specifically, for example, ANI signals might command various related data from the memory 32. Thus, an appointment may be scheduled for execution at a later time as explained in detail below.

As an alternative to simply scheduling an appointment, assume that the caller is located at the buyer terminal VP1 and wishes to initiate video contact with a specific buyer. Upon attaining communication, the call may be processed, for example, directly to the buyer terminal V1, at which appropriate videophone communication is provided with the vendor. In that regard, video monitors at the terminals V1-Vn may be compatible to receive videophone signals through the dial-up telephone system TS and the interface system 28 of the traffic control system TIS.

Whether a conference is implemented as a result of a direct call from a vendor, or as a result of a scheduled appointment, in accordance with the present development, the selected operator terminal V1-Vn (buyer terminal) is formatted to a configuration compatible with the connected vendor terminal. In that regard, the terminal AT1 (vendor) simply accommodates audio and digital signals and is representative of such terminals for use to schedule appointments, as in an ARU interface. Alternatively, person-to-person communication is available through the operator station 42.

The videophone terminal VP1 is representative of such units to provide one form of audio/video communication with one of the terminals V1-Vn. During such communication, the switch 41 is actuated to activate the videophone circuits to function in cooperation with one of the monitors V1 or Vn. Thus, compatible communication is implemented for each outgoing call, utilizing data from the memory 32.

For communication with static video systems (PIC-ASSO™ units) as represented by the terminal VS1, the switch 41 actuates the static video circuits for compatible operation of a monitor V1 or Vn. Note that particularly effective operations may involve combination formats, for example, a videophone and a static video system (likely using a single analog line). Specifically, with both of the appropriate circuits operative, the camera and the monitor V1 may function in a videophone format to accommodate effective personal communication between a buyer and a seller. Concurrently, the camera and the monitor V1 may operate in a static video format to effectively exhibit a vendor's product. Additionally, a mouse 51 at the terminal VS1, controls a cursor in the display of the monitor V1 further enhancing interactive communication. A mouse, such as the one indicated at 51 may also be provided at the buyer terminals V1-Vn. Again, the switch 41 controls the operations to attain the compatible format.

To further illustrate the possibilities, the terminal VD1 is representative of high fidelity (hi-fi) telephonic video systems using digital lines for higher resolution dynamic displays. As with respect to the other formats, the switch 41 selectively actuates the compatible circuits, the digital video circuits, to drive a selected combination of camera and monitor.

It may be seen that the video platforms of terminals V1-Vn offer considerable flexibility in accommodating multiple audio-video formats. Convenience is served by the multiple format capability of the camera along with the video monitor V1-Vn.

Figure 4:
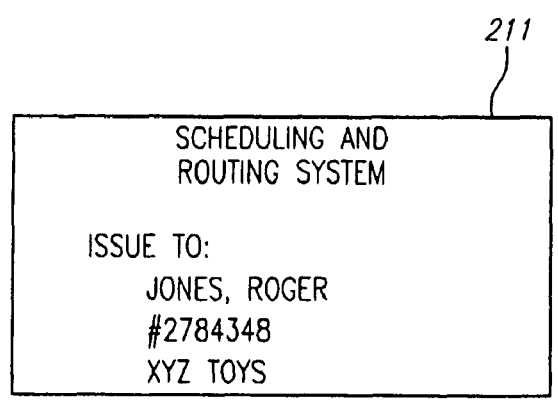
FIG. 4 is an exemplary format of an identification card issued by the scheduling and routing system.

Recapitulating, the terminal V1 has been described for communication with the various equipments at locations to include a video location for display. In addition to the display, each of the terminals V1-Vn incorporates a handpiece or equivalent, and a substantial control panel that may be in the form of a telephone pad or embodied as part of a personal computer keyboard. In any event, the control panel for each terminal V1-Vn includes the current controls for an operative video format, plus dedicated controls relating to the disclosed system. In that regard, in the interest of avoiding undue complications, only a fragment of the representative panel 80 for the terminal V1 is shown in FIG. 4.

Generally the panel 80 affords considerable control, including the use of keypad tone signals (DTMF) to perform control operations at both ends of a communication. Specifically, the fragment of the panel 80 of FIG. 4 incorporates a traditional twelve-button telephone pad 82, bearing the numerals "1" through "0" along with the symbols "*" and "#." The designated buttons each generate a distinct DTMF signal in accordance with extensive practice, which signals are communicated to all connected terminals.

Various other specific controls are provided on the panel 80. An on-off button 84 controls outgoing audio. A toggle 86 controls the volume of incoming audio. An on-off switch 88 controls video at the terminal. A pair of toggle switches 90 and 91, respectively, control zooming and panning camera operations. A push button switch 93 serves as an interrupt for locking onto the current display (high quality freeze frame)

for closer observation or to record data and in some cases higher resolution images for closer observation at a later time, for example, by use of a video printer. In addition, another toggle switch 95 controls tilting camera operations and a push button 97 advances the freeze frame for subsequent observation or reverses it back to a dynamic display. A push button switch 99 serves to manually terminate the call. A control switch 101 regulates resolution of the display. Finally a signal lamp 103 illuminates to indicate the next appointment. Generally, by using the telephone keypad 82 on the panel 80, various control functions can be accomplished as detailed in the parent patent applications identified herein under the caption "CROSS REFERENCE TO RELATED APPLICATIONS" and incorporated herein by reference.

One form of control involves video coordination. For example, in accordance with a program, a conference might be initiated in a videophone format with the terminal V1 (FIG. 2). Accordingly, the videophone circuits are active to drive the video monitor V1. At some point, assume the conference participants decide to add a static video communication. A command of "52" in touch tones on the pad 82 (see FIG. 3) initiates a series of operations. Specifically, another line connection is established by actuating the autodialer 30 (FIG. 2), then static video circuits are actuated. At the terminal V1, the static video circuits are actuated to drive the monitor V1 that may involve another monitor or split image operation. Separate displays for dynamic and still video may be used, such that a buyer at one monitor can confer with a vendor, speaking face-to-face through the camera and that monitor, while the vendor exhibits fine details of a product on a second monitor in a still image. Of course, in sequences of such still images, views can be changed and areas highlighted with a cursor controlled by the mouse 51.

As an alternative to actuating the static video format, the conferees may elect to go digital. A command "53" from the panel 46 sets the requisite steps in motion. The autodialer 30 dials up a digital connection, then using that connection, the switch 41 actuates the digital video circuits to drive one of the monitors V1-Vn. Note that with enhanced hi-fi video communication, the assumed videophone communication might best be terminated.

In view of these examples, it will be apparent that the operator at the terminal V1 has substantial control, including the ability to go from one video format to another. Of course, such operations presume that the vendor has the requisite capacity, which may be indicated in the graphic display as treated in greater detail below.

From the above descriptions, it is apparent that the disclosed system utilizes videophone technology in combination with other telephone system technology along with computer control and graphics technology to accomplish effective scheduling and processing of traffic for visual conferences.

As explained above, the exemplary central traffic control system TIS functions to initiate outgoing calls as well as receive and process incoming calls. To resume with the explanation of an incoming call from a vendor to schedule an appointment, when the telephone interface 28 (FIG. 2) receives an incoming call, it may be connected to either the operator station 42 or the audio response unit 36. Concurrently, incoming data signals (DNIS and ANI) are provided to the "D" channel processor 34 for control and/or information. For example, from the memory 32, the control computer 28 may fetch the identification of the vendor location L1 embracing one or more of the terminals VD1, etc. With such signal represented data, one or more buyers are identified with whom the vendor or vendor organization is entitled to schedule an appointment. However, to schedule an appointment, a vendor may use virtually any form of telephone instrument or terminal including any of the units AT1, VP1, VS1, VD1 or CDP1 as illustrated in FIG. 2. The unit AT1 is sufficient either for a telephonic-computer interactive call or a direct operator call (station 42) to schedule an appointment or the like.

Initially, as described above, inbound calls for a buyer, initiated by vendors, may be received through the interface system 28 (FIG. 2, upper right) for scheduling appointments or directly accommodated at a buyer location by the interface telephone switch SW (FIG. 1, center left) including the format switch 41 for visual conferences. The format switch 41 may incorporate a variable codec for analog lines AL1-ALN and digital lines DL1-DLN. For analog lines, a video CODEC along with computing capability may take the form of an AVP1000 video CODEC chip set as available from AT&T. Essentially, the CODEC chip set accomplishes videophone operation and consists of a video encoder, a video decoder and an internal system controller. The format switch unit 41 is shown as coupled between a standard analog line and a line on ISDN. Upon receiving a call from a videophone unit, the format switch unit 41 selects the appropriate line, that is, the analog line. Alternatively, upon receiving a call from a high fidelity video (digital), the format switch unit 41 selects a digital line. Also, as described above, during visual communication (real-time), a buyer may make switches, e.g., from transmitting dynamic images over a single analog line to high resolution freeze frames. The high resolution freeze frames may be viewed on large 14 inch monitors. Further, the images may be manipulated from either end, to view the freeze frame image concurrently.

In the operation of the system embracing the exemplary formats as treated above and below, a record is made for billing purposes. That is, a billing memory unit BL (FIG. 1) and a standard printer (treated below) are controlled by the computer control 28, recording all transactions in relation to billing charges. Such data can be variously processed at different times. Basically, the concept involves formulating billing data, so that at least a part of the calls made to a vendor, for example, can be rebilled to that vendor.

Considering the dial-up telephone system TS (FIG. 2) in somewhat greater detail, in arrangement, the inter-exchange carrier (e.g., AT&T) provides comprehensive data on calls specifying: phone number calling, phone number called, date, time, length of call (period), billing data and so on. Test or look-up operations are then performed with reference to a vendor database. Accordingly, portions of the charges (with or without mark-ups) are rebilled (with appropriate identification to the vendors). Such operations may be particularly effective in relation to "private" networks, e.g., the so-called SDN (software defined network), SDDN (software defined data network) which are compatible with ISDN operations, or a combination of the two service offerings (SDN with SDDN). Note that AT&T's SDN is a virtual network service which offers an organization the ability to build a private corporate network within the AT&T public network. A customized database contains information on various sites affiliated with the organization (i.e., the service organization installs a "private" network service at many different business entities) as well as features and routing information. Moreover, SDN encompasses voice, analog data, digital data and image transfer. SDDN is a feature of SDN and is most often installed in conjunction with SDN. A combination of the two provides the capability of combining all the different sites for network management and billing. Note that both buyers and vendors may wish to extend the scope of the network of participants by installing at least one similar mode of video in their branches, plants and/or customers.

Essentially, coordinated with the control computer 28 in the system TIS, reapportioning and rebilling options are executed by the billing data unit utilizing storage capacity of the memory 32 or a separate billing data memory.

To this point, detailed consideration has been primarily directed to the treatment of incoming calls to the system TIS. However, as explained, certain modes involve the placement of outgoing calls under either manual control or automatic operation. Such operations next are treated in detail.

As a result of control operations, to implement a sequence of scheduled conferences, the computer control and interface system 28 (FIG. 2) at the central traffic control site or the control computer CC at the buyer site (FIG. 1) may address, for example, the memory 32 to fetch the telephone number for an outgoing call, e.g., a vendor location L1. The telephone number is supplied from the memory 32 (or a memory at the buyer location) to the control computer CC which actuates an auto dialer, similar to auto dialer 30, to provide the dial-up signals on an off-hook line provided to the dial-up telephone system TS. Typically, at the vendor location L1, a dedicated or other line for video operations will accept the communication.

As an alternative to manual calls, the system may operate under computer control to enable a sequence of appointments. During the operation, the control computer CC (FIG. 1) fetches telephone numbers for remote locations from the memory 32 (or a memory on site) in sequence, actuates the auto dialer 34 accordingly, and assigns the resulting connections as scheduled. After a session between a particular buyer and vendor has concluded, the control computer CC terminates the connection in favor of the next waiting connection. A blinking light 103 (FIG. 3) or alternatively, a graphic display of "Five more minutes for the next appointment" may be exhibited to the caller to indicate a next appointment. The operation may result in sequential displays that have been scheduled at the particular one of the terminals V1-Vn.

Figure 5:
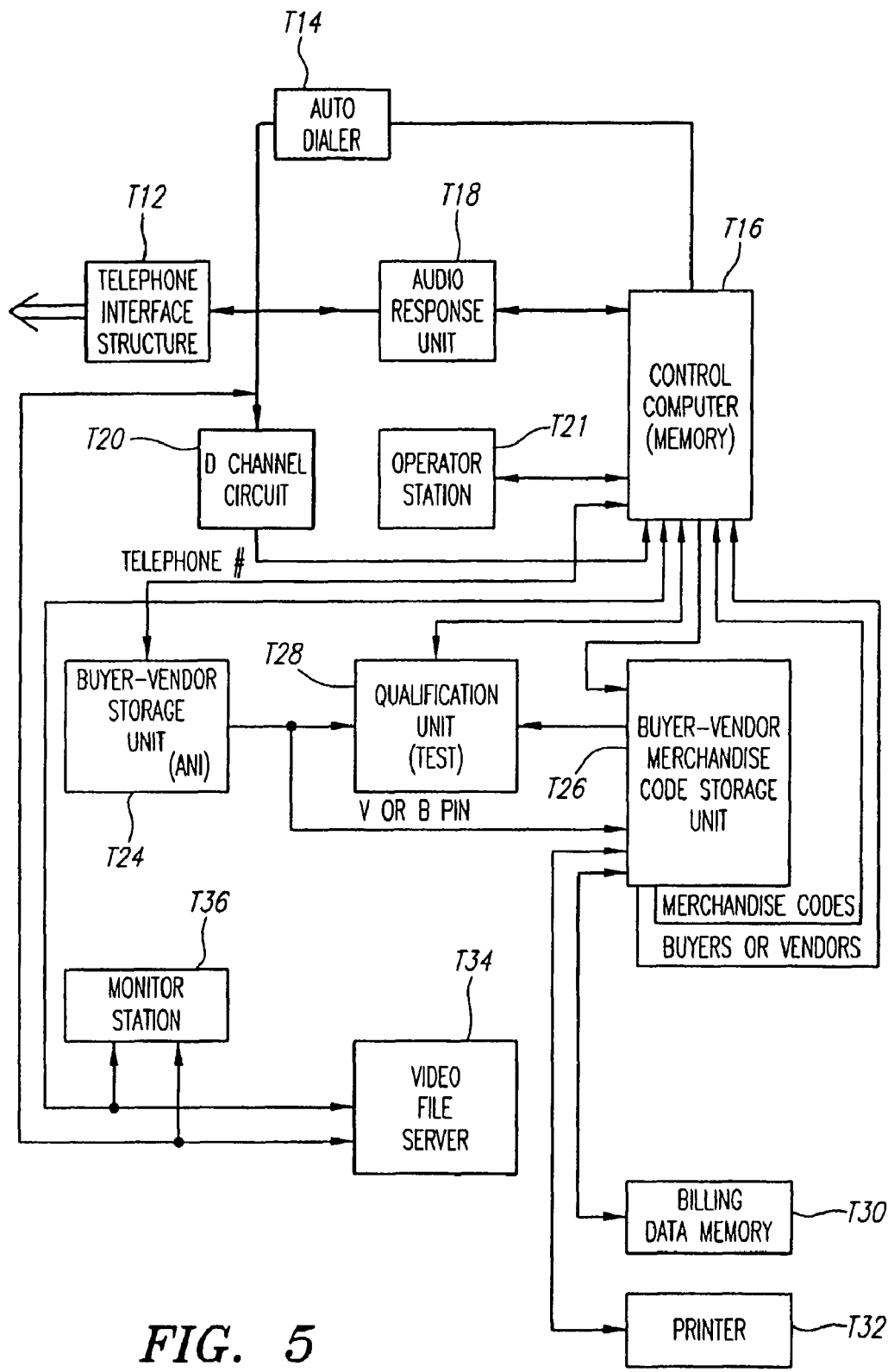
FIG. 5 is a more detailed block diagram illustrating the central traffic control system of the scheduling and routing system of FIG. 2.

Different selling and buying companies may be registered with the central traffic control system TIS. At registration, central traffic control system TIS may issue an identification card with a check digit for qualification to each representative of the selling or buying company (FIG. 5). An exemplary identification card (embodied for display) is indicated at 211. For example, assume that XYZ company has four vendor representatives, all located at vendor location L1 equipped with analog capabilities only. Further assume that the telephone number for that location is (212) 555-5555. Accordingly, the traffic control system TIS may assign an identification number and store the following information under that identification number in memory: Jones, Roger, XYZ Toy Company, Analog System, Telephone number (212) 555-5555, Registered to interact with EFG Company (central station number—(310) 666-6666), no priority, IJK Company (central station number—(414) 777-7777), priority with buyer no. 3, Thursday appointments may be offered to vendors with priority status. At registration, each vendor and buyer fills out a subscription form or otherwise provides the central traffic control system with specific information, such as the nature of the merchandise they are designated to sell or buy. This information may be provided with reference to an established list of merchandise codes. The designated merchandise codes assist the selectivity logic 47 in making routing determinations to avoid information overload. Similarly, vendors and buyers seeking appointments are qualified on the basis of these merchandise codes and limited to making appointments only with authorized persons.

To make an appointment, a special offering or a proposal in response to a buyer request, the vendor may initiate dial-up operations with the central traffic control system TIS. For such calls, the ARU 36 may provide voice cues to the vendor and prompt touch tone input of responses as described above. A single ARU may be used for different organizations, alternatively, different ARU's may be used for different large organizations. The ARU's may include voice-mail capabilities for individual buyers. After recording all the information pertaining to a special offering or proposal, the central traffic control system provides reservation or identification numbers. For example, callers may be queried via the ARU if calling to cancel an appointment or supplement a special offering or proposal. If a call is merely to cancel an appointment, the vendor would only need to enter the appointment number. Likewise, if the call is simply to report that a sale for a special offering has been consummated, the vendor may only need to enter an identification number.

Note that live operators also may take information from vendors and access the traffic control computer TIS to enter appropriate request data processed similar to the automatic features of the system in the event vendors are calling from a rotary telephone or for other reasons. Additionally, the live operators may transfer calls to an ARU to enable vendors to leave voice-mail messages.

The traffic control system TIS may provide schedule or other data to individual buyers via facsimile, either automatically or upon request. Alternatively, schedule or other data may be provided to individual buyers by downloading data onto a computer at the buyer's location typically in batch mode overnight. Recent changes to appointments or special offerings and proposals may be displayed on the buyer's terminal (real-time) or forwarded by electronic-mail.

At the central traffic control site, which may service numerous business entities, several audio response units (ARU) may be used in conjunction with several groups of live operators. To accommodate large numbers of calls, automatic call distributors (ACD) may be utilized to route calls where the different business entities are identified by DNIS.

It should be recognized that video recordings on specific merchandise may be stored at the video file server 37 for viewing by buyers and sales may be consummated without any visual conferences between vendors and buyers.

Also, it should be recognized that the buyer terminals disclosed herein may be used by retailers to sell products directly to the persons having units similar to the vendor units described herein in their homes. In such a scenario, ANI may be used to identify a particular household calling, and DNIS may be used to identify a particular product of interest.

As indicated above, the traffic control system TIS incorporates structure for a wide variety of communications through the dial-up telephone system TS. FIG. 5 illustrates a more specific exemplary form of the system TIS. A telephone interface T12 (upper left) accommodates a multitude of line connections to the dial-up public telephone system TS (FIGS. 1 and 2) accommodating two-way communication with various capabilities as treated above.

The interface structure T12 (FIG. 5) accommodates the placement of outgoing calls by an auto dialer T14 controlled by a computer T16 incorporating substantial memory. Auto dialers are well known in the telephone arts functioning to place calls in response to digital instructions. As the source of such digital instructions, along with others, the control computer T16 comprises a substantial computing capability, functioning to control telephonic traffic in various communication forms through the telephone interface structure T12. Traffic is controlled, both for servicing and interconnecting remote terminals at both vendor and buyer locations, e.g., buyer locations BS1-BSn (FIG. 1) and vendor terminals, e.g. terminals L1-Ln.

The control computer T16 also is connected to an audio response unit T18 for vocally cueing and otherwise interfacing remote stations through the telephone interface structure T12. Again, various forms of audio response units are well known in the telephonic arts for verbalizing cues, receiving digital signals and performing some processing. In that regard, the audio response unit T18 may incorporate some dictionary capability or may rely on the control computer T16 for an extended dictionary of words to be vocalized.

The control computer T16 also is connected to receive signals from the telephone interface structure T12 through a "D" channel circuit T20. For example, the "D" channel circuit receives ANI and DNIS signals indicative of calling and called station numbers as explained above. Essentially, the "D" channel circuit T20 provides call related information to the control computer T16 in accordance with well known techniques of the telephonic arts.

Recapitulating to some extent, it may be seen that the control computer T16, along with the above-mentioned structures, has substantial capability to interface with remote terminals. However, under certain conditions, manual communication also may be desired. Accordingly, as explained above, an operator station T21 is coupled to the computer T16 to accommodate a human interface. The operator station T21 may take the form of a CRT terminal with graphics display capability and various controls (FIG. 5) implemented through the control computer T16.

As indicated above, to accomplish the traffic control function, the computer T16 has substantial computing capability, specifically, for purposes of control, storage management, delivery, scheduling and interconnecting remote stations. For convenience of explanation, in FIG. 5, several operating components that could be integrated in the computer T16 are separately illustrated. Such separate illustration also facilitates the operating explanations. Specifically, separate storage capacity is illustrated in the form of a buyer-vendor storage unit T24 and a buyer-vendor/merchandise code storage unit T26. The storage units T24 and T26 are addressed by the control computer T16 to provide data that is processed along with other data to control and facilitate on-line and off-line communications between buyer and vendor terminals.

As suggested above, communication between the various vendors and buyers involves substantial control and regulation along with limitations, thus, the term traffic control is deemed appropriate. In that regard, a qualification unit T28 is coupled both to the control computer T16 and the storage units T24 and T26. Essentially, the qualification unit T28 receives identification and limitation data to qualify buyers and vendors for select individual communications. The storage unit T26 is coupled directly to the computer T16, along with a billing data memory T30 and a printer T32 for operation as mentioned above.

Summarizing the extensive treatment above, the present system variously implements both online and offline communication as between vendors and buyers. The communication is considerably enhanced by video displays. Accordingly, a video file server T34 is coupled directly to the telephone interface structure T12 and to the control computer T16. A monitor station T36 is similarly coupled, as for select time or call monitoring.

In view of the preliminary description of the structure (FIG. 5) a comprehensive explanation of the system now may be expressed by assuming particular situations and describing typical operating sequences. Accordingly, assume the structure of FIG. 5 is coupled as the traffic control system TIS in the system of FIG. 2 for controlling and regulating select communications between vendor and buyer terminals. In that regard, a system of merchandise classification is used to enhance the selectivity of communication to prevent information overload. Generally, merchandise is classified in accordance with a decimal system, somewhat equated to the channels of commerce for various goods. For example, a component of such a classification is as follows.

CHART A

| Merchandise | Decimal Code |
| --- | --- |
| Body Treatment | 470000 |
| Skin | 471000 |
| Sun Cream | 47260 |
| Prevent & Protect | 471230 |
| Water Resist | 471234 |
| Tanning | 471235 |
| Cream | 471300 |
| Moisture | 471310 |
| Cleansing | 471320 |
| Hair | 472000 |

In accordance with the exemplary classification, "body-treatment" merchandise carries the code "470000". More explicit classifications of such merchandise carry additional decimal indicators. For example, as indicated above, water-resistant, sun protection treatment would be identified by the code "471234". Accordingly, entire ranges of merchandise are classified and coded to control and regulate communication traffic in accordance herewith.

Generally, preliminary inquiries, offers for sale and requests for proposals all carry merchandise codes for selectively identifying potentially interested vendors or buyers. As a further element of classification, buyers or vendors also may be assigned specific codes, for example, designating a business primarily as, supermarkets, department stores, drug stores and so on.

As detailed below, the operation of the system will be treated as it regulates and controls video communication, for example, selectively between vendors and buyers, to expedite traditionally complex purchasing operations. In that regard, the embodiment treats six types of telephone calls. Specifically, primary calls are classified in accordance with the following chart.

CHART B

| Type Call | Nature |
| --- | --- |
| "A" | Vendor with special offering |
| "B" | Buyer responding to special offering |
| "C" | Buyer with Request for Proposal (RFP) |
| "D" | Vendor responding to RFP |
| "E" | Vendor seeking appointment |
| "F" | Buyer seeking appointment |

Typically, calls of the various types involve some form of qualification or approval. For example, access to the system typically will be limited to qualified or registered entities. Also, certain limitations will be imposed on such entities. For example, calls that would reveal one vendor's proposal to another vendor are inhibited. Also, it may be desirable to limit calls from buyers accessing information related to another buyer. Of course, specific forms of limitations and qualifications may be implemented depending upon specific applications. However, in accordance with the disclosed embodiment, the types of calls set out above, all involve some form of qualification. The qualifications are generally performed by the qualification unit T28 (FIG. 5) utilizing information derived from a call correlated with reference data from the storage units T24 and T26. In that regard, the logic for the qualification unit T28 may be implemented in accordance with the flow diagram of FIG. 6 as will now be considered.

In the disclosed embodiment, the qualifications for buyers and vendors are somewhat similar. Specifically, the tests for a calling vendor are:

Is the calling station registered as a vendor (or buyer)?

Can the caller give a proper PIN number (Identification Number)?

Is the vendor qualified for the designated merchandise?

Is the vendor approved for an identified buyer or buyers?

Figure 6:
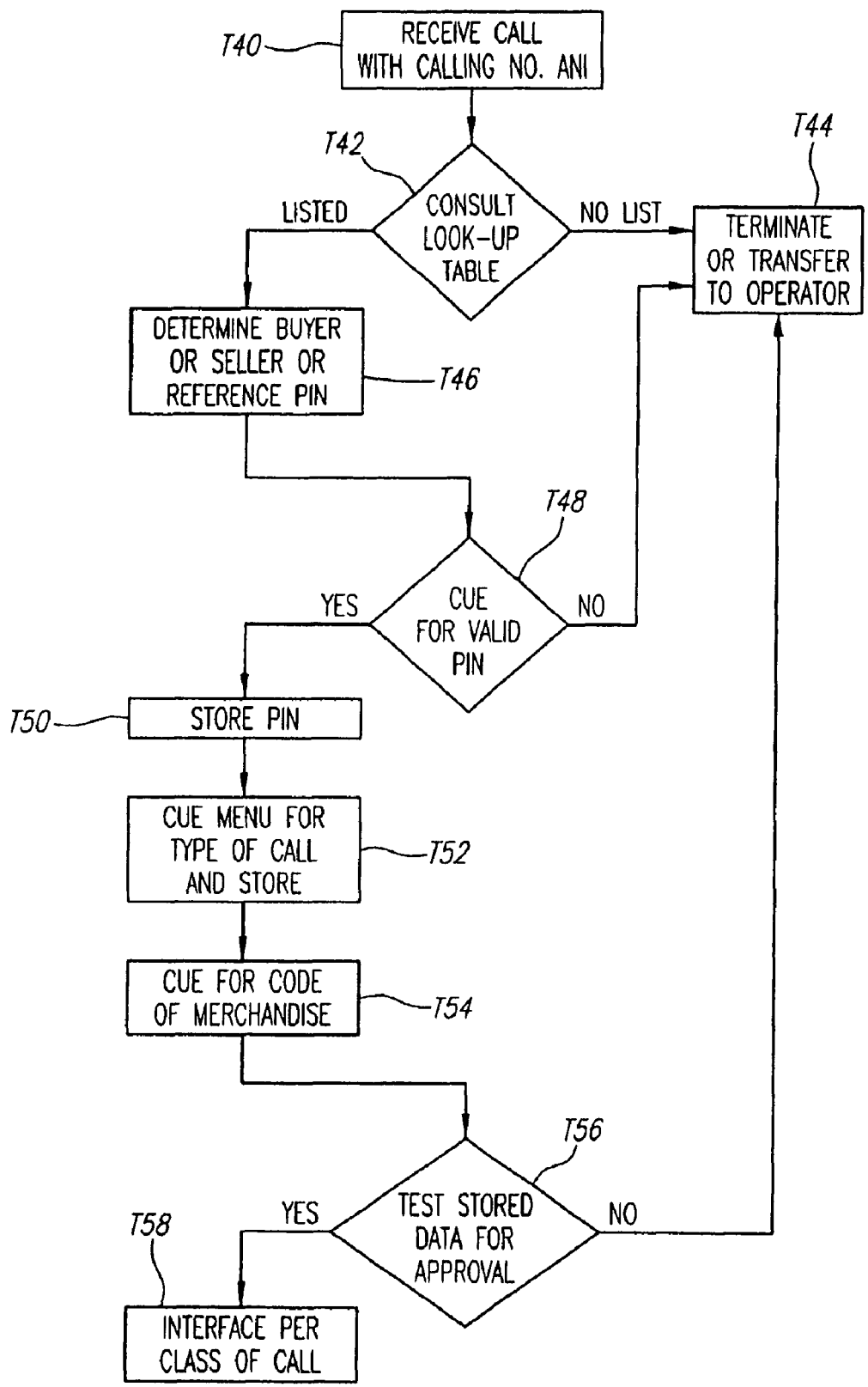
FIG. 6 is a logic flow diagram illustrating an exemplary operation format of the system of FIG. 5 for automated qualification of callers, such as vendors or buyers.

The tests for calling a buyer are quite similar. To consider the logic embodied in the qualification unit T28 (FIG. 5), reference will now be made somewhat concurrently to FIGS. 5 and 6. With the occurrence of an incoming call through the telephone interface structure T12 (FIG. 5), "D" channel signals are supplied through the circuit T20 to the control computer T16. As a result, the computer T16 addresses the buyer-vendor storage unit T24, using the call number of the originating terminal (ANI). Of course, in other applications DNIS signals may be similarly employed. The operation is illustrated by a block T40 (FIG. 6). Addressed by the calling number, the storage unit T24 (FIG. 5) supplies representative signals indicating: first, that the calling terminal does belong to a registered buyer or seller, whether the entity is a buyer or a seller, and the identification number (PIN) for the entity. The operation of consulting the storage unit T24 or look-up table is illustrated by a query block T42 in FIG. 6.

If the calling terminal number is not located, indicating an unregistered caller, the qualification unit T28 (FIG. 5) actuates the computer T16 for appropriate control. Specifically, the audio response unit T18 may be prompted to provide a termination message or the operator station T21 may be actuated for a human interface. Such alternatives are represented in FIG. 7 by the block T44.

For calls originating from a registered terminal, the qualification unit T28 (FIG. 5) stores the pertinent data, i.e., buyer or seller and reference PIN. The operation is illustrated in FIG. 7 by the block T46.

With the determination of a properly registered calling terminal, the computer T16 actuates the audio response unit T18 providing a verbal cue for an identification number (PIN). The operation is illustrated in FIG. 7 by the query block T48. If the caller enters keypad digital information indicating an invalid PIN, or makes no entry at all, the operation again proceeds to the block T44 for termination or transfer of the call as explained above. With the entry of a valid PIN, the operation proceeds to store the personal identification number as indicated by a block T50.

The qualification unit T28 (FIG. 5) next functions in cooperation with the computer T16 driving the audio response unit T18 to cue the caller for the type of call and the merchandise code, see blocks T52 and T54 (FIG. 6) representing such operations. Although such operations are not detailed in FIG. 6, it is to be understood that improper responses or the lack of a response will transfer the process to the function of block T44, as illustrated, to terminate or transfer the call. On the contrary, if appropriate information is received, the qualification unit T28 (FIG. 5) receives and stores the requested information. Consequently, the unit T28 contains: the caller's PIN number, the call type and the merchandise code. That data is then tested within the qualification unit T28, against reference data, in a process step as illustrated by the query block T56 in FIG. 7. The details of the test are treated in somewhat greater detail below; however, as illustrated in FIG. 7, if the tests are not successful, the process again proceeds to the termination block T44; otherwise, the process proceeds to a block T58 to implement the substantive communication of the call.

The final test of the call involves operation of the qualification unit T28 (FIG. 5) in conjunction with the storage unit T26. That is, for each buyer and vendor, the unit T26 stores merchandise codes and, in some instances, other special information. For example, typically, vendors may be denied access to certain information. For example, a vendor would not have access to the type calls: "A" (a special offering of another vendor), "D" (another vendor responding to an RFP) and so on. However, exceptions are possible and in that regard it is simply important to appreciate that special situations may be stored in the unit T26.

Returning to the routine situation, as indicated above, each buyer and vendor is associated with specific merchandise codes. In that regard, merchandise codes not only facilitate and expedite communication but additionally, charges and billing data (for storage in the memory T30) may be based on active merchandise codes for a subscriber.

Pursuing a specific example, assume a caller, identified as a vendor and otherwise qualified is pursuing the presentation of a special offering. Further assume that the calling vendor is associated only with hair products (Chart A, code 472000). However, assume that the caller identifies the "merchandise of interest" to be a water resistant sun skin product, code 471234. Thus, the identified merchandise code does not coincide with the caller's registered merchandise code. In such a case, the processing is halted with the consequence that the call is either terminated or transferred to an operator. At this stage, likely operation would involve referring the call to an operator. Thus, the qualification unit T28 concludes the test by assuring that the entity being represented by a call is authorized for access with respect to the identified codes.

Once a caller has been identified, the control computer T16 (FIG. 5) functions primarily in conjunction with the video file server T34 to implement the communication. Of course, in instances where an appointment is sought, as described in detail above, the function of the video file server T34 may be relatively nominal. Note with regard to appointments, that a caller may simply request an appointment immediately within call types "E" and "F". That is, within the concept of obtaining an appointment, a caller may simply seek to speak with a particular vendor or buyer representative immediately.

To consider the specific operations, assume that the exemplary caller is a vendor with a special offering, i.e., call type "A". As a specific example, the caller may represent a vendor entity dealing in distressed merchandise holding a considerable volume of hair shampoo packaged for women, i.e., merchandise code "472147". With the merchandise codes stored, the control computer T16 actuates the video file server T34 along with the audio response unit T18 to receive a video presentation of the merchandise, that is, the hair shampoo. Typically, the vendor will have organized the presentation prior to making the telephone call so that the merchandise can be variously demonstrated and various information including pricing etc. expressed in the video presentation. Thus, an effective record of the video presentation is stored in the file server T34 essentially in the form of a sales presentation for the hair shampoo, that is, product code "472147".

With the completion of the video record, the control computer T16 actuates the storage unit T26 to isolate all buyers associated with the product code "472147", identifying hair shampoo. With the list of buyers identified and a video presentation recorded, the subsequent operations involve communicating the video presentation to the select group of buyers. In accordance with the disclosed embodiment, the identified buyer group is notified of the availability of the demonstration. Thereafter, qualified buyers may establish communication (call "B") through the telephone interface structure T12 (FIG. 5) to receive the stored video presentation from the file server T34. Various specific arrangements may be involved. The central traffic system may maintain a record or log of all the buyers accessing the video file server, which may be provided to the vendor, upon request. A record of the time (provided by the clock) spent by each buyer in viewing a video presentation may also be maintained. For example, a specific buyer may terminate the video after viewing it for only a few minutes, while another buyer may view the entire video presentation. The vendor may request such information to determine buyers' reactions to the special offering, for marketing or other reasons.

In some situations, it may be particularly advantageous for buyers to receive early notice of a special offering by a vendor. Accordingly, it may be desirable to implement a rotational order scheme or a random operation for determining the sequence in notifying buyers. Specifically, a random number generator may be incorporated in the control computer T16 for ordering the list of buyers for notification.

Notices to buyers or vendors also may vary considerably, depending upon individual programming considerations. In some situations, vendors may provide a special list of buyers or alternatively, exclude specific buyers. All buyers and vendors are provided with a list of participating members of the network, at registration. Periodic updates of new members may be circulated from time to time.

In accordance with the disclosed embodiment, the control computer T16 simply actuates the auto dialer T14 to establish telephonic communication with buyers after which the audio response unit T18 notifies the buyer. Alternatives involve the utilization of facsimile or the like capability or various forms of electronic mail may be incorporated for utilization. In any event, the select group of buyers is notified that the presentation on a hair shampoo packaged for women is accessible by interfacing through the telephone structure T12. Responding buyers (call type "B") are qualified as described above, then coupled to the video file server T34 to receive the video presentation. Thereafter, interested buyers may directly contact the vendor, typically for further video communication. Thus, the foundation for a transaction is completed rapidly and effectively with substantial communication of the goods involved and related considerations.

Another possibility involves type "C" calls, whereby a buyer distributes a request for proposal. Again, various communications may be accomplished to a select group or sub-group of vendors based on merchandise codes. To consider a specific form of communication in accordance herewith, after qualification, a buyer might use video communication to notify vendors with a graphic such as one illustrated in FIG. 9. FIG. 9 illustrates an exemplary buyer request form providing specific information of the merchandise. Blank forms may be stored in a forms directory (e.g. menu-driven) or the like on each buyers terminal. Thus, when making a request for proposals, a buyer may simply access a blank form and enter the specific information. Essentially, a merchandise code number "472361" is supplied, indicating the specific product as also identified in the graphic. After the notice has been sent to vendors, a message as represented in FIG. 10 may be transmitted to the buyer from the central traffic control system TIS. Note that a check digit may be supplied. Likewise, vendors may access blank forms, similar to the exemplary buyer request forms, to indicate special offerings.

Following receipt of a request for proposal, interested vendors may submit a video presentation as described above. Alternatively, vendors may be invited to call for an appointment or otherwise communicate their proposals to buyers. Thus, the system affords considerable flexibility in selectively communicating product information between buyers and sellers using video formats.

In view of the above description, it will be apparent that numerous operating formats, programs and layouts may be accomplished using a wide variety of videophone equipment in cooperation with computing and telephone apparatus. As indicated above, the disclosed embodiments afford some arrangements; however, the scope hereof should not so confined, rather the scope hereof should be in accordance with the claims as set forth below.

What is claimed is:

1. A method for selectively accomplishing electronic communications between members of plural groups, including at least one potential buyer and multiple vendors, the multiple vendors located at widely distributed remote sites, the at least one potential buyer communicating with at least one vendor of the multiple vendors, via one or more commercial transaction communication control systems, comprising the steps of:

providing access by the at least one potential buyer to said commercial transaction communication control system via an interface, receiving and storing dynamic or sequences of high resolution still images video data for the at least one vendor for providing select ones of dynamic or sequences of high resolution still images video data to the at least one potential buyer from the at least one vendor where the at least one vendor is an appropriate one of the vendors selected by the commercial transaction communication control system, wherein the select ones of the dynamic or sequences of high resolution still images video data is provided to the at least one potential buyer at a buyer terminal, providing graphic data including text data communications between the at least one vendor and said at least one potential buyer, storing data associated with the at least one potential buyer seeking a transaction in a memory associated with the commercial transaction communication control system including buyer identification data and data relating to the transaction the buyer is seeking that includes request data entered by the at least one potential buyer via a buyer terminal wherein the buyer indicates the request data to the commercial transaction communication control system for routing to the at least one vendor, and in some instances, to fulfill a request, selectively processing the data relating to the transaction the buyer is seeking by first identifying select data including dynamic or sequences of still images video and the graphic data including text data provided from a source relating to the at least one vendor and then providing the dynamic or sequences of high resolution still images video and graphic data including text data to said buyer at a buyer terminal responsive to said data; and in some instances, to fulfill a request, selectively routing the request data via the one or more multiple commercial transaction control systems to communicate with one or more widely distributed vendors with capabilities to fulfill the request.

2. A method according to claim 1, further comprising the step of:
utilizing a camera associated with said one or more vendors to provide said dynamic or sequences of high resolution still images video data.

3. A method according to claim 1, wherein the camera is adapted to image the vendor.

4. A method according to claim 1, further comprising the step of:
storing the dynamic or sequences of high resolution still images video data in a memory associated with the vendor.

5. A method according to claim 1, wherein the buyer uses the buyer terminal to view at least certain of the dynamic video data in freeze frames.

6. A method according to claim 1, wherein at least certain of the dynamic or sequences of high resolution still images video data is provided to the buyer in real time.

7. A method according to claim 6, wherein the real-time video is live person-to-person video communication.

8. A method according to claim 1, wherein at least certain of the dynamic video data includes two-way video.

9. A method according to claim 1, wherein at least certain of the dynamic video data is provided as stored video data.

10. A method according to claim 1, wherein the audio communication is received by the buyer in real time.

11. A method according to claim 1, wherein the graphic data including text data communications between the vendor and the buyer include provision of commercial transaction data.

12. A method according to claim 11, wherein the commercial transaction data includes order data.

13. A method according to claim 11, wherein the commercial transaction data includes product identification data.

14. A method according to claim 1, further comprising the step of:
maintaining storage of various categories and subcategories of products or services for controlling communications between a potential buyer and the at least one vendor that include graphic data including text data that relate to the products or services.

15. A method according to claim 1, further comprising the step of:
providing a notification for the at least one vendor to the potential buyer to indicate one or more special offerings relating to the product or service.

16. A method for selectively accomplishing electronic communications according to claim 1, wherein certain vendors are accorded a priority status under control of the one or more commercial transaction communication control systems.

17. A method according to claim 1, wherein access to the video data is provided according to a priority status.

18. A method according to claim 1, wherein access is provided in accordance with a rotational order.

19. A method according to claim 1, wherein access is provided in accordance with a random order.

20. A method according to claim 1, further comprising the step of:
sending the potential buyer or the at least one vendor an email relating to the transaction subsequent to the step of communicating with the one or more widely distributed vendors to fulfill a request.

21. A method according to claim 1, wherein the sequences of high resolution still images relate to fulfilling the request data from the potential buyer.

22. A method according to claim 1, wherein the potential buyer communicates with the one or more commercial transaction communication control systems via an online service.

23. A method according to claim 1, wherein the step of selective routing is accomplished via the one or more multiple coordinated commercial transaction control systems.

24. A method according to claim 14, wherein the communications are entered via a keypad.

25. A method according to claim 14, wherein at least certain of the communications are transmitted via email.

26. A method according to claim 15, further comprising the step of:
informing the buyer of recent changes to the special offerings that are for display on the buyer's terminal.

27. A method according to claim 26, wherein the recent changes to the special offerings are communicated in real-time.

28. A method according to claim 26, wherein the recent changes to the special offerings are forwarded by electronic-mail.

29. A method according to claim 15, wherein the notification for the vendor to the buyer is provided by electronic-mail.

30. A method according to claim 15, wherein the notification for the vendor to the buyer is provided by electronic-mail.

31. A method for selectively accomplishing electronic communications between members of plural groups, including at least one potential buyer and at least one vendor, at widely distributed remote sites, via one or more commercial transaction communication control systems, comprising the steps of:
accessing said system via an interface,
receiving and storing high resolution still video data from one or more vendors for providing the high resolution still video data to said buyer at a buyer terminal upon selection by the commercial transaction communication control system,
providing graphic data including text data communications for said vendors to said buyer,
storing data associated with a buyer, in a memory associated with the commercial transaction communication control system including buyer identification data and request data entered by the buyer, and
selectively processing the request data to fulfill a request by first identifying select data including high resolution still video and graphic data including text data relating to the vendor and then providing the high resolution still video and graphic data including text data to said buyer responsive to said request data; and
in some instances, to fulfill a request, selectively routing the request data via one or more multiple coordinated commercial transaction control systems, to communicate with one or more widely distributed vendors, with capabilities to route the request data between the one or more vendors based on the request data to fulfill the request.

32. A method according to claim 31, further comprising the step of: utilizing a camera associated with said vendor to provide said high resolution still video data.

33. A method according to claim 31, wherein the camera is adapted to image the vendor.

34. A method according to claim 31, further comprising the step of:
storing the still image video data in a memory associated with the vendor.

35. A method according to claim 31, wherein at least certain of the still image video data is provided to the buyer in freeze frames.

36. A method according to claim 31, wherein at least certain of the still image video data is provided to the buyer in real time.

37. A method according to claim 36, wherein at least certain of the still image video data includes two-way video.

38. A method according to claim 36, wherein the real-time video is live person-to-person video communication.

39. A method according to claim 31, wherein at least certain of the still image video data is provided as stored video data.

40. A method according to claim 31, wherein the audio communication is received by the buyer in real time.

41. A method according to claim 31, wherein commercial transaction data for the vendor is provided to the buyer with the graphic data including text data communications.

42. A method according to claim 41, wherein the commercial transaction data includes product identification data.

43. A method according to claim 41, wherein the commercial transaction data includes order data.

44. A method according to claim 31, further comprising the step of: maintaining an inventory of products or services and providing special offerings to buyers for certain of the products or services.

45. A method according to claim 31, further comprising the step of:
providing a notification for the vendor to the buyer when there is a special offering on a distressed product or service.

46. A method for selectively accomplishing electronic communications according to claim 31, wherein certain vendors are accorded a priority status under control of the one or more commercial transaction communication control systems.

47. A method according to claim 31, wherein access to the video data is provided according to a priority status.

48. A method according to claim 31, wherein access is provided in accordance with a rotational order.

49. A method according to claim 31, wherein access is provided in accordance with a random order.

50. A method according to claim 31, wherein the plural groups include a group for plural vendors classified in accordance with the nature of vendor offerings.

51. A method according to claim 31, wherein access by the buyer to the system is provided via an online service.

52. A method according to claim 31, further comprising the step of: subsequent to all the prior steps, communicating with the buyer via email with respect to the request.

53. A method according to claim 31, wherein said buyer is provided access to said system for viewing of offerings related to at least certain vendors from the multiple vendors and wherein the system facilitates routing of communications between the multiple vendors.

54. A method according to claim 31, wherein said system provides access to multiple certain ones of the vendors via the interface.

55. A method according to claim 31, wherein said selective routing is accomplished via the one or more multiple coordinated commercial transaction control systems.

* * * * *

UNITED STATES PATENT AND TRADEMARK OFFICE
CERTIFICATE OF CORRECTION

PATENT NO. : 8,098,272 B2
APPLICATION NO. : 10/724330
DATED : January 17, 2012
INVENTOR(S) : Ronald A. Katz Page 1 of 1

Figure 3:
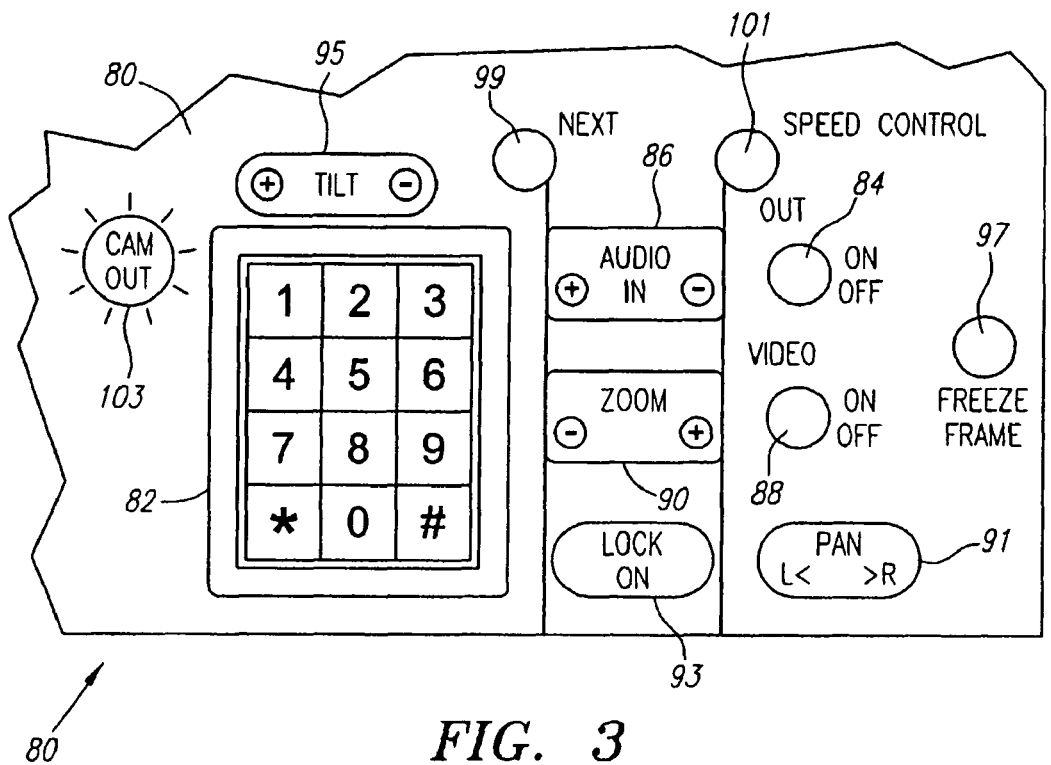
FIG. 3 is a graphic representation of a portion of the control panel of an element in the system of FIG. 2.

It is certified that error appears in the above-identified patent and that said Letters Patent is hereby corrected as shown below:

Column 14,
Line 51, "FIG. 4" should be -- FIG. 3 --.
Line 55, "FIG. 4" should be -- FIG. 3 --.

Column 17,
Line 41, "FIG. 5" should be -- FIG. 4 --.

Column 21,
Line 45, "FIG. 7" should be -- FIG. 6 --.
Line 49, "FIG. 7" should be -- FIG. 6 --.
Line 53, "FIG. 7" should be -- FIG. 6 --.

Column 22,
Line 7, "FIG. 7" should be -- FIG. 6 --.
Lines 8-9, "FIG. 7" should be -- FIG. 6 --.

Signed and Sealed this
Ninth Day of April, 2013

Teresa Stanek Rea
*Acting Director of the United States Patent and Trademark Office*